United States Patent [19]

Ninomiya et al.

[11] Patent Number: 4,634,633
[45] Date of Patent: Jan. 6, 1987

[54] MAGNETIC RECORDING MEDIUM

[75] Inventors: Yoshinobu Ninomiya; Masashi Somezawa; Kiyokazu Oiyama, all of Miyagi, Japan

[73] Assignee: Sony Corporation, Tokyo, Japan

[21] Appl. No.: 678,814

[22] Filed: Dec. 6, 1984

[30] Foreign Application Priority Data

Dec. 15, 1983 [JP] Japan .................. 58-236911
Dec. 19, 1983 [JP] Japan .................. 58-239530

[51] Int. Cl.$^4$ ................................. G11B 5/72
[52] U.S. Cl. ...................... 428/425.9; 252/62.5 Y; 360/134; 360/135; 360/136; 427/128; 427/131; 428/694; 428/900
[58] Field of Search .............. 428/694, 900, 425.9, 428/695; 427/44, 131, 128; 252/62.54; 360/134-135

[56] References Cited

U.S. PATENT DOCUMENTS

| | | | |
|---|---|---|---|
| 4,328,282 | 5/1982 | Lehner | 428/694 |
| 4,328,935 | 5/1982 | Steel | 427/131 |
| 4,419,406 | 12/1983 | Isobe | 427/44 |
| 4,521,486 | 6/1985 | Ninomiya | 428/425.9 |
| 4,529,661 | 7/1985 | Ninomiya | 428/694 |
| 4,567,108 | 1/1986 | Lehner | 428/900 |
| 4,567,109 | 1/1986 | Lehner | 428/900 |
| 4,568,610 | 2/1986 | Lehner | 428/900 |
| 4,568,612 | 2/1986 | Lehner | 428/900 |

Primary Examiner—Ellis P. Robinson
Attorney, Agent, or Firm—Hill, Van Santen, Steadman & Simpson

[57] ABSTRACT

A magnetic recording medium has a magnetic layer consisting essentially of a binder and magnetic particles on one surface of a non-magnetic substrate. The thermoplastic polyurethane-urea resin in which unsaturated bonds sensitive to radiation are introduced is used as the binder.

The thermoplastic polyurethane-urea resin in which the radiation-sensitive unsaturated bonds are introduced has both urethane and urea bonds in the molecular structure thereof. It is synthesized from long chain diol with a molecular weight of approximately 500 to 5000, a short chain diol with a molecular weight of approximately 50 to 500, an organic diisocyanate, an organic diamine, and a compound containing radiation-sensitive unsaturated double bonds, and cured by radiation.

The thermoplastic polyurethane-urea resin in which not only the radiation-sensitive double bonds but also hydrophilic polar groups are introduced may also be used as the binder. These hydrophilic polar groups may for example include —SO$_3$M, —OSO$_3$M, —COOM, and

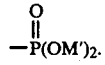

101 Claims, No Drawings

MAGNETIC RECORDING MEDIUM

BACKGROUND OF THE INVENTION

1. Field of the Invention

The present invention relates to a magnetic recording medium and, more particularly, to a magnetic recording medium having a coating layer in which a binder having improved properties is used.

2. Brief Description of the Prior Art

Heretofore, the vinyl chloride-vinyl acetate copolymers, cellulose derivatives or polyester resins have been used extensively as the binder for the magnetic recording medium. The thermoplastic polyurethane resin has also been used for improving wear resistance or controlling coating properties of the magnetic layer of the recording medium.

On the other hand, the magnetic recording medium is required to satisfy the demand for high density recording. As a result thereof, attempts have been made towards reducing the size of the ferromagnetic powders to be filled in the magnetic layer and towards improved smoothness of the surface of the mangetic layer.

However, with improved surface smoothness of the magnetic layer, the contact area thereof is increased, so that the running performance and durability of the recording medium are affected, while its anti-blocking performance is also drastically lowered. Above all, since the conventional binder has a low softening point and inferior heat resistance, when the magnetic recording medium in the tape form is taken up and stored on a reel under elevated temperatures or for a prolonged time, it is liable to become tightly affixed to the non-magnetic substrate neighboring to the magnetic layer, in such a manner that, on account of the resulting exfoliation of the magnetic layer, the properties of the magnetic recording medium are not exhibited satisfactorily. In addition, an increase in the specific surface resulting from comminution of ferromagnetic powders not only results in the drastically lowered dispersibility of the powders in the binder and deteriorates surface gloss and filling properties, but also renders it difficult to prevent powder debris or tape injury or to provide sufficient running durability or electromagnetic properties or characteristics that are critical to the magnetic recording medium.

Hence, in order to elevate heat resistance of the thermoplastic polyurethane resin and thereby improve anti-blocking of the magnetic recording medium, it has been proposed to use the termoplastic polyurethane resin as the binder for the magnetic layer of the recording medium, wherein the ratio of the low molecular weight diol in the thermoplastic polyurethane resin is increased for elevating the concentration of the urethane groups in the molecule.

The thermal properties of thermoplastic polyurethane resins may be improved in general by increasing the concentration of the urethane groups. That is, the higher the concentration of the urethane groups in the molecule, the higher the softening point of the thermoplastic polyurethane resin and the lower its glass transition temperature. However, with increase in urethane group concentration in the thermoplastic polyurethane resin, it becomes undesirably insoluble in general-purpose solvents such as ketones, alcohols, esters, aromatic hydrocarbons or aliphatic hydrocarbons, it being only soluble in solvents of higher toxicity such as dimethylformamide or tetrahydrofuran. Moreover, dimethylformamide or tetrahydrofuran used as solvent for a magnetic paint for the formation of the magnetic layer may corrode surface portions of the substrate on which the paint is applied, or any surface portions or materials with which it may be brought into contact, so that creases or wrinkles are partially caused or, in some cases, these portions may become dissolved. Therefore, there is a limitation on improvement by elevating the concentration of urethane groups in the thermoplastic polyurethane resin.

Furthermore, even when the thermoplastic polyurethane resin with elevated concentration in the urethane groups is used as the binder for the magnetic layer, it has only negligible effects in improving the dispersibility of the comminuted ferromagnetic powders in the binder.

OBJECTS AND SUMMARY OF THE INVENTION

It is an object of the present invention to provide a magnetic recording medium with a layer containing a thermoplastic polyurethane-urea resin having improved heat resistance, anti-blocking and durability as a binder.

It is another object of the present invention to provide a magnetic recording medium with a layer containing a binder further having improved compatibility with other resin and a solvent.

It is a further object of the present invention to provide a magnetic recording medium with a layer containing a binder which is hardened with a sufficiently high density of cross linkages.

It is a still further object of the present invention to provide a magnetic recording medium with a layer containing a binder by using a paint of a sufficiently long pot life.

It is a yet further object of the present invention to provide a magnetic recording medium with a layer containing a binder further having improved dispersibility of a pigment, an inorganic filler or the like.

According to an aspect of the present invention, there is provided a magnetic recording medium comprising a non-magnetic substrate and a magnetic layer formed thereon composed mainly of magnetic powder and a binder, said binder containing a thermoplastic polyurethane-urea resin having unsaturated bonds sensitive to irradiation.

According to another aspect of the present invention, there is provided a magnetic recording medium comprising a non-magnetic substrate and a magnetic layer formed thereon composed mainly of magnetic powder and a binder, said binder containing a thermoplastic polyurethane-urea resin having unsaturated bonds sensitive to irradiation and at least one hydrophilic polar group selected from the group consisting of the groups represented by general formulas:

wherein M is hydrogen or alkali metal and M' is hydrogen, alkali metal or hydrocarbon group.

DESCRIPTION OF THE PREFERRED EMBODIMENTS

The present inventors have found that, by using a thermoplastic polyurethane-urea resin which is obtained by reacting a long chain diol, a short chain diol, an organic diamine and an organic diisocyanate as a binder for the magnetic layer of the magnetic recording medium, the magnetic layer may be improved drastically in thermal and anti-blocking performance and durability, and that the thermoplastic polyurethane-urea resin is soluble in the aforementioned general-purpose solvents.

However, when the thermoplastic polyurethane-urea resin is used as the binder in the above described manner, a curing agent is required for curing the binder, while a prolonged heat treatment step is required to effect the curing and the shape of the product is deteriorated on account of the changes in volumetric contraction of the resin. Moreover, the above resin presents problems as to pot life since the time of charging of the curing agent, thus giving rise to constraints in handling the magnetic paint.

The present inventors have conducted researches for obviating the problems of the magnetic recording medium containing the aforementioned thermoplastic polyurethane-urea resin as the binder for the magnetic layer of the magnetic recording medium, and have found that, when the thermoplastic polyurethane-urea resin in which unsaturated bonds sensitive to irradiation are introduced is used as the binder, curing can be effected by irradiation in a shorter time without impairing the merit of the polyurethane-urea resin. This finding has been the basis of the present invention.

The present inventors have also found that dispersibility of the ferromagnetic powers or particles may be improved by introducing hydrophilic polar groups into the thermoplastic polyurethane-urea resin.

The thermoplastic polyurethane-urea resin has a characteristic that both urethane bonds and urea bonds are contained in the molecular structure thereof, and in that hydrophilic polar group or groups as well as unsaturated bond or unsaturated bonds sensitive to irradiation are introduced into the resin.

The aforementioned urethane and urea bonds play an important role in improving thermal properties of the binder and provide for lowering the glass transition temperature of the resin and elevating its softening point which is a measure of the heat resistance of the resin. In addition, these bonds are effective in improving anti-blocking and maintaining stable physical properties of the magnetic layer over a wide range of temperature. Thus the introduction of the urea groups as well as that of urethane groups is effective in elevating the thermal properties of the resin. More importantly, the introduction of urea groups gives a resin which is readily soluble in a solvent system consisting of a combination of the aforementioned solvents, that is, ketones, alcohols, esters, aromatic hydrocarbons and aliphatic hydrocarbons. Moreover, the concentration of the polar groups (urethane and urea groups) in the thermoplastic polyurethane-urea resin molecules can be rendered higher than that in the ordinary thermoplastic polyurethane resin, thus resulting in the improved interaction among the molecules and improved durability and coating properties of the resulting magnetic layer. Thus, by using the thermoplastic polyurethane-urea resin as the binder for the magnetic recording medium, there may be provided a magnetic recording medium which is superior in anti-blocking and durability.

The combined concentration of the aforementioned thermoplastic polyurethane-urea resin is preferably 1.8 to 3.0 m mol/g. With the concentration less than 1.8 m mol/g, the softening point of the resin is lowered and anti-blocking is not improved. With the concentration exceeding 3.0 m mol/g, the resin becomes insoluble in general-purpose solvents, it being soluble only in dimethylformamide or the like toxic solvents. On the other hand, the ratio of urea group concentration to urethane group concentration is preferably in the range of 0.3 to 1.6. With the ratio less than 0.3, the resin is insoluble in general-purpose solvents and, with the ratio in excess of 1.6, the glass transition temperature of the resin becomes higher.

The radiation-sensitive unsaturated bonds to be introduced into the thermoplastic polyurethane-urea resin may include acrylic or methacrylic double bonds. When irradiated with an electron beam or the like radiation, the unsaturated double bonds can be opened easily for providing a crosslinked structure so that the curing time of the resin is markedly shortened with improvement in wear-resistance and durability of the magnetic layer.

The amount of introduction of the unsaturated bonds sensitive to radiation into the thermoplastic polyurethane resin is preferably in the range of 0.1 to 1.0 m mol/g. With the amount of introduction of the unsaturated bonds less than 0.1 m mol/g, the curing reaction does not proceed promptly while the strength of the resulting coating is lowered. With the introduction of the unsaturated bonds in excess of 1.0 m mol/g, the degree of cross-linking becomes too high so that the coating structure is poorer in durability, or the reactivity becomes too high so that the resin can in general not be handled easily.

Since the hydrophilic polar groups introduced as side chains of the thermoplastic polyurethane-urea resin exhibit superior affinity with the ferromagnetic particles mixed into the magnetic layer, these ferromagnetic powders can be dispersed smoothly into the binder so as to deal successfully with the increased specific surface of the ferromagnetic powders. In addition, the introduction of the hydrophilic polar groups into the thermoplastic polyurethane-urea resin contributes to improved dispersibility of the ferromagnetic powders and to improved physical properties of the magnetic layer. Thus the introduction of the hydrophilic polar groups renders it possible that the ferromagnetic powders and the binder interact directly with one another so that the magnetic layer exhibits superior strength and durability.

These hydrophilic polar groups may be enumerated by —SO$_3$M, —OSO$_3$M, —COOM and

wherein M represents a hydrogen atom or an alkali metal and M' a hydrogen atom, an alkali metal or a hydrocarbon residue.

The amount of the hydrophilic polar groups introduced into the thermoplastic polyurethane-urea resin is preferably in the range of 0.01 to 1.0 m mol/g and more preferably in the range of 0.1 to 0.5 m mol/g. With the amount of the hydrophilic polar groups less than 0.1 m mol/g, the groups are not sufficiently effective in improving dispersibility of the ferromagnetic powders. With the amount in excess of 1.0 m mol/g, may take place so that dispersibility of the ferromagnetic powders may be lowered on account of the intermolecular or intramolecular aggregation, and/or the ordinary or general-purpose solvents are unable to be used with the resin.

It should be noted that the number-average molecular weight of the thermoplastic polyurethane-urea resin is preferably 2000 to 60000 and more preferably 5000 to 40000. With the number-average molecular less than 2000, the film forming capacity of the resin becomes insufficient. With the number-average molecular weight higher than 60000, it is possible that problems may be caused the mixing, transport and coating steps during the preparation of the magnetic paint.

The softening temperature of the termoplastic polyurethane-urea resin is preferably higher than 80° C. and more preferably higher than 100° C. With the softening temperature lower than 80° C., the properties of the resin are closer to those of the conventional thermplastic polyurethane resin so that it becomes impossible to improve physical properties and anti-blocking of the thermoplastic polyurethane-urea resin.

It should also be noted that the glass transition temperature of the polyurethane-urea resin is preferably lower than 0° C. and more preferably lower than −10° C. With the glass transition temperature higher than −10° C., the transition temperature of the physical properties approaches undesirably to ambient temperature.

The method of producing a thermoplastic polyurethane-urea resin employed in the magnetic recording medium of the present invention is hereinafter explained.

The thermoplastic polyurethane-urea resin is prepared by polyaddition of a long chain diol, a short chain diol, an organic diamine and an organic diisocyanate. This polyaddition is carried out by a prepolymer method in which a mixture of a long chain diol and a short chain diol is previously reacted with an organic diisocyanate to give an isocyanate-terminated prepolymer to which an organic diamine is added to effect chain prolongation and introduction of the urea groups.

The long chain diol employed in the preparation of the thermoplastic polyurethane-urea resin has a molecular weight of approximately 500 to 5000, and may be classified for example into polyester diols, polyether diols and polyether ester glycols. The polyester diols may include lactonic polyester diols obtained by ring opening polymerization of lactones such as ε-caprolactone, or polyester diols obtained by reacting aliphatic dicarboxylic acids such as succinic acid, adipic acid, sebacic acid or azelaic acid or aromatic dicarboxylic acids such as terephthalic acid or isophthalic acid, or esters thereof with lower alcohols, with ethylene glycol, 1,3-propyrene glycol, 1,4-butylene glycol, 1,6-hexane glycol, diethylene glycol, neopentyl glycol, an ethylene oxide adduct of bisphenol A, or a mixture thereof. The polyether diols may for example include polyalkylene ether glycols such as polyethylene glycol, polypropyrene ether glycol or polytetramethylene ether glycol, or a polyether glycol which is a copolymer thereof. The polyether ester glycols may for example be obtained by reacting aliphatic or aromatic dicarboxylic acid with the aforementioned polyalkylene ether glycol as polyol component. If the molecular weight of the long chain diol is too small, the concentration of urethane groups of the resulting thermoplastic polyurethane-urea resin becomes too high so that the resin becomes less pliable and less soluble in solvents. This is not desirable when the resin is to be used as the binder for the magnetic recording medium. On the other hand, when the molecular weight of the long chain diol is too large, the contents of long chain diols in the resin become too high so that the concentration of the urethane groups is too low with resultingly lowered wear and heat resistance of the resin.

The short chain diols employed for the preparation of the thermoplastic polyurethane-urea resin has a molecular weight approximately equal to 50 to 500, and may for example include aliphatic glycols such as ethylene glycol, propyrene glycol, 1,4-butylene glycol, 1,6-hexane glycol or neopentyl glycol, or aromatic diols such as ethylene or propyrene adducts of bisphenol A, or ethylene oxide adducts of hydroquinone, these being used either singly or in admixture at any desired ratio depending on the desired properties of the polyurethane-urea resin.

The aforementioned orgnaic diamines may include aliphatic diamines such as tetramethylene diamine or hexamethylene diamine, aromatic diamines, such as m-phenylene diamine, p-phenylene diamine, 2,4-tolylenediamine, 2,6-tolylenediamine, m-xylylenediamine, p-xylylenediamine, diphenylmethanediamine, 3,3'-dimethoxy-4,4'-biphenylenediamine, 3,3'-dimethyl-4,4'-biphenylenediamine, 4,4'-diaminodiphenylether, 1,5-naphthalenediamine or 2,4-naphthalenediamine, or cycloaliphatic diamines such as 1,3-diaminomethylcyclohexane, 1,4-diaminomethylcyclohexane, 4,4'-diaminodicyclohexylmethane or isophoronediamine.

The organic diisocyanates may include aliphatic diisocyanates such as tetramethylene diisocyanate or hexamethylene diisocyanate, aromatic diisocyanates such as m-phenylene diisocyanate, p-phenylene diisocyanate, 2,4-tolylene diisocyanate, 2,6-tolylene diisocyanate, diphenylamine diisocyanate, 3,3'-dimethoxy-4,4'-biphenylene diisocyanate, 3,3'-dimethyl-4,4'-biphenylene diisocyanate, 4,4'-diisocyanate diphenyl ether, 1,5-naphthalene diisocyanate or 2,4-naphthalene diisocyanate or cycloaliphatic diisocyanates such as 1,3-diisocyanate methyl cyclohexane, 1,4-diisocyanate methyl cyclohexane, 4,4'-diisocyanate dicyclo hexylmethane or isophorone diisocyanate.

In the above described reaction, the molar ratio of the short chain diols to the long chain diols is preferably less than 3. If the molar ratio is too large, the concentration of the urethane groups becomes too high so that the resulting polyurethane-urea resin is undesirably not soluble in the aforementioned general-purpose solvents used for the preparation of the magnetic paint. When the straight chain diols such as ethylene glycol, 1,4-butylene glycol or 1,6-hexane glycol are employed as short chain diols, the aforementioned molar ratio is preferably less than 1 and more preferably less than 0.5. When ethylene or propyrene oxide adducts of bisphenol A or branched short chain diols such as neopentylglycol are used as short chain diols, the above molar ratio may be increased as compared to the case of using the straight chain diols because of the improved solubility of the resin. In this case, however, the above molar ratio excessively higher than 3 is again not desirable because the solubility of the resin is correspondingly lowered. The long chain or short chain diols may also be used singly depending on their molecular weight.

In the preparation of the thermoplastic polyurethane-urea resin employed in the present invention, polyester diols, and above all polybutylene adipate, polyhexamethylene adipate or polycaprolactone diols are most preferred among the aforementioned compounds as long chain diols having the molecular weight of approximately 500 to 5000. Likewise, branched short chain diols and above all neopentyl glycol are most preferred among the aforementioned compounds as short chain diols having the molecular weight of approximately 50 to 500. On the other hand, isophorone diamine is most preferred among the aforementioned compounds as the organic diamines, while 4,4-diphenylmethane diisocyanate and isophorone diisocyanate are most preferred among the aforementioned compounds as the organic diisocyanates.

The methods of polyaddition reaction adopted in the preparation of the thermoplastic polyurethane-urea resin employed in the present invention may include a melt polymerization according to which the reaction is carried out in the molten state, and a solution polymerization according to which the reaction is carried out in a solution of the raw materials as referred to hereinabove in an inert solvent such as ethyl acetate, methylethylketone, acetone or toluene or a mixture thereof. For the manufacture of the thermoplastic polyurethane resins which are employed in a solution in a solvent in many cases, such as the binder for the magnetic recording medium, the solution polymerization is preferred. It is particularly preferred that the melt polymerization is carried out during the preparation of the prepolymer and, prior to the chain prolongation reaction, the solution polymerization of the prepolymers is carried out in a solution thereof in the inert solvent.

In carrying out the reaction, organometallic compounds such as organotin compounds, e.g. stannous octylate or dibutyltin dilaurate, or tertiary amines, such as N-methyl morpholine or triethylamine, may be added as catalyst. In order to increase the stability of a product, an antioxidant, an ultraviolet ray absorbing agent, a hydrolysis preventive agent or the like may be added in necessary amounts.

It should be noted that the unsaturated bonds sensitive to radiation such as acrylic or methacrylic groups be introduced into the aforementioned thermoplastic polyurethane resin, by, for example, (i) a method of using organic diamines, organic diisocyanates or diols having unsaturated bonds sensitive to radiation as the starting material for thermoplastic polyurethane-urea resin; or by (ii) a method of modifying the terminal OH-groups of the thermoplastic polyurethane-urea resin for introducing the unsaturated bonds sensitive to saturation.

According to the above described method (i), the organic diamine, diisocyanate or diol having the unsaturated bonds sensitive to radiation are polymerized with other raw materials so as to form a part of the polymer molecule chain of the thermoplastic polyurethane-urea resin, so that the unsaturated bonds sensitive to radiation are introduced into the resulting thermoplastic polyurethane-urea resin.

For example, the aforementioned organic diamines having the unsaturated bonds can be prepared by reacting a compound having a functional group or functional groups capable of reacting with active hydrogen or hydrogens of the amino group and an unsaturated double bond or double bonds capable of being easily opened by irradiation, such as

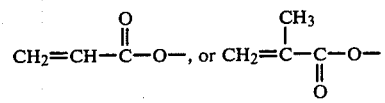

with organic triamines or organic diamines. For example, the organic diamine having unsaturated bonds sensitive to radiation as shown by the formula

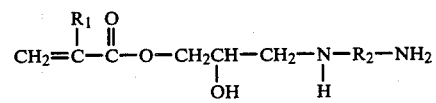

(wherein $R_1$ represents a hydrogen atom or a methyl group and $R_2$ a divaleric hydrocarbon residue having 2 to 12 carbon atoms) can be obtained by the reaction of equimolar amounts of glycidyl acrylate or methacrylate and an organic diamine.

The aforementioned organic diisocyanates having an unsaturated bond or unsaturated bonds can be obtained by reacting a compound having both active hydrogen or hydrogens and double bond or double bonds sensitive to radiation with an organic triisocyanate. The compounds having both the active hydrogen or hydrogens and the double bond or double bonds sensitive to radiation may be enumerated by acrylic acid or methacrylic acid, hydroxyalkyl esters of acrylic acid or methacrylic acid such as 2-hydroxyethyl ester, 2-hydroxypropyl ester, 2-hydroxybutyl ester, 2-hydroxyoctyl ester, 2-hydroxydodecyl ester, 2-hydroxy-3-chloropropyl ester, 2-hydroxy-3-acryloxypropyl ester, 2-hydroxy-3-methacryloxypropyl ester, 2-hydroxy-3-acetoxypropyl ester, 2-hydroxy-3-chloroacetoxypropyl ester, 2-hydroxy-3-dichloroacetoxypropyl ester, 2-hydroxy-3-trichloroacetoxypropyl ester, 2-hydroxy-3-crotonyloxypropyl ester or 2-hydroxy-3-allyloxy ester of acrylic acid or methacrylic acid, or hydroxy polyacrylates such as trimethylolpropane diacrylate, trimethylolpropane dimethacrylate, pentaerythritol triacrylate, pentaerythritol trimethylacrylate, dipentaerythritol pentacrylate or dipentaerythritol pentamethacrylate. On the other hand, as the aforementioned organic triisocyanate, compounds shown by a formula

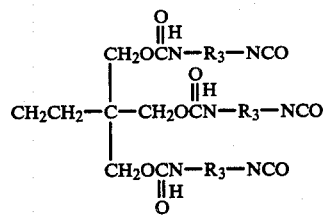

wherein $R_3$ represents a group selected from the group consisting of

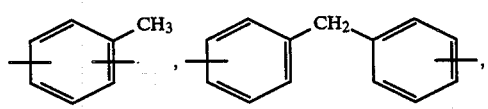

, —(CH$_2$)$_6$—,

[structure: 1,3-dimethyl cyclohexane with (CH$_3$)$_2$ and CH$_3$, CH$_2$— substituents]

$$-CH_2-\underset{\underset{CH_2-CH_2-CH_2-CH_2-}{|}}{\overset{(CH_3)_2}{C}}-\overset{CH_3}{\underset{|}{C}}H-,$$

[structure: dicyclohexylmethane with two ring attachments]

or compounds represented by the formula $$OCN-(CH_2)_l-\underset{\underset{O-R_4-NCO}{|}}{\overset{\overset{|}{C=O}}{CH}}-NCO$$

wherein R$_4$ designates a divaleric hydrocarbon residue having 2 or 3 carbon atoms and l an integer larger than 4, may be employed. The latter compounds may be enumerated by 2,6-diisocyanate hexanoic acid-2-isocyanate ethyl, 2,6-diisocyanate hexanoic acid-3-isocyanate propyl or 2,6-diisocyanate hexanoic acid-2-isocyanate-2-methylethyl. These compounds may be easily prepared by phosgenation of an ester of amino alcohols with lysine.

The aforementioned diols having an unsaturated double bond or double bonds can be prepared by reacting a triol with a compound having a radiation-sensitive double bond or double bonds and a functional group or groups capable of reacting with OH-groups, such as epoxy or aziridinyl groups. The compounds having radiation-sensitive double bonds and epoxy or aziridinyl groups may be enumerated by the following compounds (a) to (c).

$$CH_2=\underset{\underset{}{|}}{\overset{R_5}{C}}-COO-(CH_2)_n-N\underset{CH_2}{\overset{CH_2}{\diagdown\diagup}} \qquad (a)$$

$$CH_2=CHCH_2OCO-(CH_2)_n-N\underset{CH_2}{\overset{CH_2}{\diagdown\diagup}} \qquad (b)$$

$$CH_2=\underset{\underset{}{|}}{\overset{R_5}{C}}-COO-(CH_2)_n-CH\underset{O}{\overset{}{\diagdown\diagup}}CH_2 \qquad (c)$$

wherein R$_5$ represents a hydrogen atom or a methyl group and n an integer from 1 to 8.

Among these compounds, 2-(1-aziridinyl)ethyl methacrylate, allyl-2-aziridinyl propionate and glycidyl methacrylate are preferred. As the aforementioned triol, there may be employed.

(A) glycerin $$(HOCH_2-\underset{\underset{OH}{|}}{\overset{\overset{H}{|}}{C}}-CH_2OH),$$

(B) an ethylene oxide adduct of glycerol $$(HOCH_2CH_2OCH_2-\underset{\underset{OH}{|}}{\overset{\overset{H}{|}}{C}}-CH_2OCH_2CH_2OH)$$

or $$(HOCH_2CH_2OCH_2-\underset{\underset{OH}{|}}{\overset{\overset{H}{|}}{C}}-CH_2OCH_2CH_2OCH_2CH_2OH)$$

(C) 2-methylpropane-1,2,3-triol $$(HOCH_2-\underset{\underset{OH}{|}}{\overset{\overset{CH_3}{|}}{C}}-CH_2OH)$$

(D) 4,4-bis(2-hydroxyethyl)-2-hydroxypentane $$(CH_3-\underset{\underset{CH_2CH_2OH}{|}}{\overset{\overset{CH_2CH_2OH}{|}}{C}}-CH_2-\underset{\underset{OH}{|}}{CH}-CH_3)$$

(E) 3-methylpentane-1,3,5-triol $$(HOCH_2CH_2-\underset{\underset{OH}{|}}{\overset{\overset{CH_3}{|}}{C}}-CH_2CH_2OH)$$

(F) 1,2,6-hexane triol $$HOCH_2\underset{\underset{OH}{|}}{CH}CH_2CH_2CH_2CH_2OH$$

(G) 1-bis(2-hydroxyethyl)amino-2-propanol $$HOCH_2CH_2NCH_2CH_2OH$$
$$\underset{\underset{\underset{OH}{|}}{\underset{HC-CH_3}{|}}}{CH_2}$$

(H) propylene oxide adduct of diethanol amine $$HOCH_2CH_2NCH_2CH_2OH$$
$$\underset{\underset{HC-CH_2-\underset{\underset{CH_3}{|}}{CH}-OH}{|}}{\overset{CH_2}{|}} \text{ or}$$

(I) ethylene oxide adduct of N-isopropanol diethanol amine

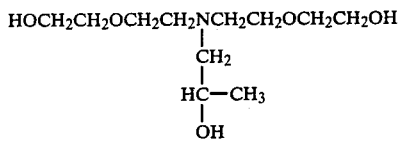

According to the method (ii), the both terminal OH-groups of the polyurethane-urea resin previously subjected to chain prolongation to a predetermined molecular weight are modified for introducing the radiation-sensitive unsaturated bond.

For modifying the OH-groups, the compound having a functional group or functional groups capable of reacting with active hydrogen or hydrogens of these OH-groups and radiation-sensitive double bonds are caused to act directly on the terminal OH-groups. Alternatively, diisocyanate compounds and the compounds having the active hydrogen or hydrogens and radiation-sensitive double bond or double bonds are subjected to an equimolar reaction to give a reaction product between the active hydrogen and the one NCO-group of the diisocyanate compound, and the terminal OH-groups of the thermoplastic polyurethane-urea resin are reacted with the remaining NCO-group of the aforementioned reaction product.

As the compounds that may be caused to directly act on the terminal OH-groups of the polyurethane-urea resin, those having radiation-sensitive double bonds and the epoxy or aziridinyl groups such as those used in the preparation of the diols having an unsaturated bond or unsaturated bonds as mentioned hereinabove may be employed. The radiation-sensitive double bonds can be introduced into the polyurethane-urea resin by causing these compounds to act directly on the terminal OH-groups of the resin. The reaction may be shown by

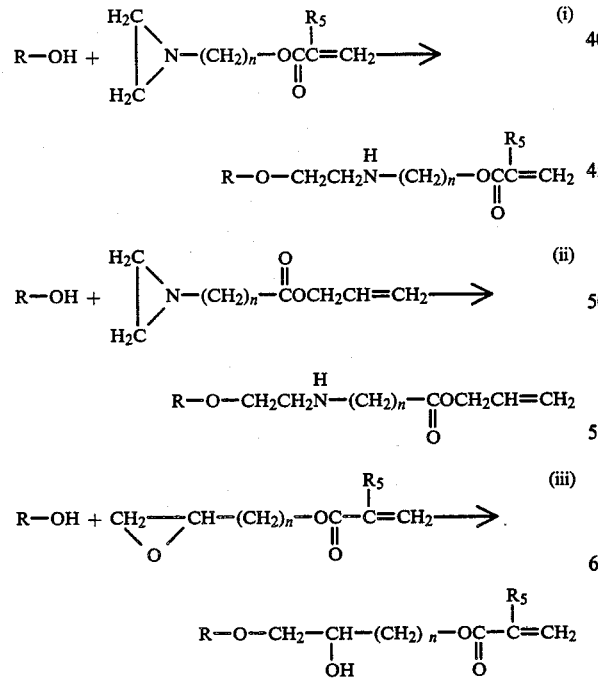

wherein R represents a thermoplastic polyurethane-urea resin, R₅ a hydrogen atom or a methyl group and n an integer of 1 to 8.

The compounds to be reacted with the isocyanate compounds for introducing the radiation-sensitive double bond or double bonds into the polyurethane-urea resin and having active hydrogen or hydrogens and radiation-sensitive double bond or double bonds, may be enumerated by acrylic acid or methacrylic acid, hydroxyalkyl esters such as hydroxymethyl ester, 2-hydroxyethyl ester, 3-hydroxypropyl ester, 4-hydroxybutyl ester or 8-hydroxyoctyl ester of acrylic acid or methacrylic acid, acrylamide, methacrylamide, N-methylol acrylamide or N-methylol methacrylamide. The aforementioned diisocyanate compounds may be enumerated by aliphatic diisocyanates such as hexamethylene diisocyanate, isophorone diisocyanate, dicyclohexylmethane diisocyanate or methylcyclohexane diisocyanate, or aromatic diisocyanates such as m-phenylene diisocyanate, p-phenylene diisocyanate, 2,4-tolylene diisocyanate, 2,6-tolylene diisocyanate, 1,3-xylylene diisocyanate, 1,4-xylylene diisocyanate, 1,5-naphthalene diisocyanate, 4,4'-diphenylmethane diisocyanate, 3,3'-dimethyl-4,4'-diphenylmethane diisocyanate, 3,3'-dimethylbiphenylene diisocyanate, ditolylene diisocyanate or cyanicidine diisocyanate. The reaction may be shown by the following reaction formula (i) to (iii).

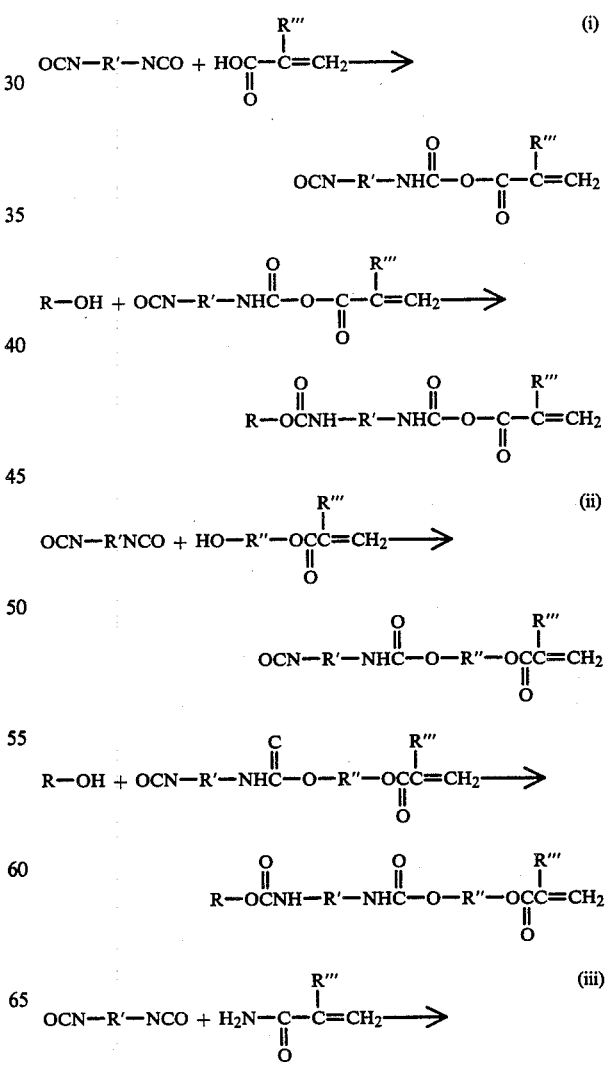

-continued

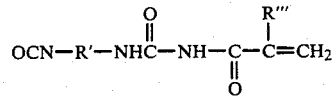

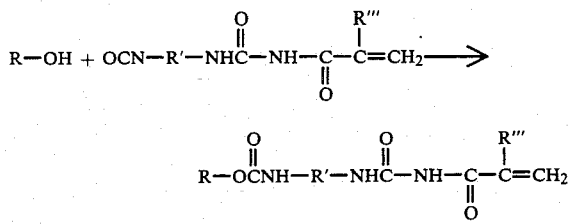

wherein R represents a thermoplastic polyurethane-urea resin, R' and R" represent divaleric hydrocarbon residues and R"' represents a hydrogen atom or a methyl group.

When introducing hydrophilic polar groups or a radiation-sensitive unsaturated bond or unsaturated bonds into the thermoplastic polyurethane-urea resin, these groups or bonds can be introduced by (i)' a method which consists in previously mixing a compound containing a hydrophilic polar group or hydrophilic polar groups and a compound containing an unsaturated bond or unsaturated bonds sensitive to radiation into the starting material of the thermoplastic polyurethane-urea resin;

(ii)' a method which consists in previously mixing a compound containing an unsaturated bond or saturated bonds sensitive to radiation into the starting material of the thermoplastic polyurethane resin and modifying the terminal OH-groups of the resulting thermoplastic polyurethane-urea resin with a compound containing hydrophilic polar groups; or (iii)' a method which consists in previously mixing a compound containing a hydrophilic polar group or groups into the starting material of the thermoplastic polyurethane-urea resin and modifying the terminal OH-groups of the resulting thermoplastic polyurethane-urea resin with a compound containing an unsaturated bond or unsaturated bonds sensitive to radiation.

The compounds containing hydrophilic polar groups employed in the method (i)' may include diols containing hydrophilic polar group or groups, diisocyanates containing hydrophilic polar group or groups, and diamines containing hydrophilic polar group or groups. The compounds containing an unsaturated bond or unsaturated bonds sensitive to radiation may include diols containing an unsaturated bond or unsaturated bonds sensitive to radiation, organic diisocyanates containing an unsaturated bond or unsaturated bonds sensitive to radiation, and organic diamines containing an unsaturated bond or unsaturated bonds sensitive to radiation. These compounds previously mixed into the starting material of the thermoplastic polyurethane-urea resin may form a part of the polymer molecular chain of the thermoplastic polyurethane-urea resin upon polymerization with other compounds so that the hydrophilic polar group or groups and the unsaturated bond or unsaturated bonds sensitive to radiation are introduced as the side chains into the polyurethane-urea resin.

The aforementioned diols containing hydrophilic polar group or groups may include diols containing a phosphate group represented by a general formula

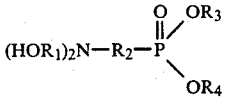

wherein $R_1$ represents a substituted or unsubstituted alkylene groups with 2 to 6 carbon atoms, $R_2$ a substituted or unsubstituted alkylene groups with 1 to 6 carbon atoms and $R_3$, $R_4$ represent alkyl groups with 1 to 6 carbon groups.

The diols may also include those containing a $-SO_3M$ group, where M represents a hydrogen atom or an alkali metal. These $-SO_3M$ group containing diols may be obtained by reacting a carboxylic acid component free of the $-SO_3M$ group, a glycol component and a dicarboxylic acid component containing the $-SO_3M-$ group.

The carboxylic acid component free of the $-SO_3M$ group may include aromatic dicarboxylic acids such as terephthalic acid, isophthalic acid, orthophthalic acid or 1,5-naphthalic acid, aromatic oxycarboxylic acid such as p-oxybenzoic acid or p-(hydroxyethoxy)benzoic acid, aliphatic dicarboxylic acids such as succinic acid, adipic acid, azelaic acid, sebacic acid or dodecanedicarboxylic acid, and tri- and tetracarboxylic acids such as trimellitic acid, trimesic acid and pyromellitic acid.

The aforementioned glycol component may include ethylene glycol, propyrene glycol, 1,3-propanediol, 1,4-butanediol, 1,5-pentanediol, 1,6-hexanediol, neopentylglycol, diethylene glycol, dipropyrene glycol, 2,2,4-trimethyl-1,3-pentanediol, 1,4-cyclohexanedimethanol, an ethylene oxide adduct and a propyrene oxide adduct of bisphenol A, and ethylene oxide adduct and a propyrene oxide adduct of hydrogenated bisphenol A, polyethyleneglycol, polypropyrene glycol and polytetramethylene glycol. Tri- and tetraols such as trimethylolethane, trimethylolpropane, glycerin and pentaerythritol may also be used in conjunction with the aforementioned glycol component.

The dicarboxylic acid component containing the $-SO_3M$ groups may include 5-sodium sulfoisophthalic acid, 5-potassium-sulfo-isophthalic acid, 2-sodium-sulfoterephthalic acid and 2-potassium-sulfo-terephthalic acid.

The aforementioned organic diisocyanates containing the hydrophilic polar groups can be obtained by reacting polyisocyanate compounds having three or more functional groups with a compound containing the hydrophilic polar group or groups.

Among these polyisocyanate compounds, there are known trifunctional compounds known under the trade names of "Desmodule L" (manufactured by Bayer AG) and "Coronate L" (manufactured by Nippon Polyurethane Co. Ltd.) In general, the polyfunctional polyisocyanate compounds may be obtained by addition reaction of polyols and polyisocyanates.

The polyols may include propyrene glycol, glycerol, trimethylolpropane, pentaerithritol and sorbitol. The polyisocyanates may include tolylene diisocyanate, 4,4-diphenylmethane diisocyanate, naphthylene diisocyanate, hexamethylene diisocyanate, isophorone diisocyanate, xylene diisocyanate and lysine diisocyanate.

Several methods of introducing the hydrophilic polar groups into the polyisocyanate compounds having three or more functional groups are briefly explained below.

(i) The method of the introduction of the —SO₃M group

A compound having a —SO₃M group and more than two —NCO groups in one molecule may be obtained by reacting a compound having a —SO₃M group in one molecule and one or more active hydrogen capable of reacting with —NCO groups and a polyisocyanate compound having more than three functional groups.

The compound having a —SO₃M group and one or more active hydrogen capable of reacting with —NCO groups in one molecule may be enumerated by:

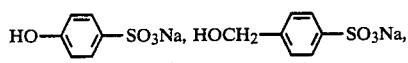

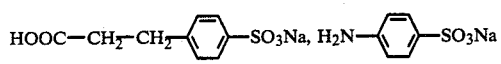

and

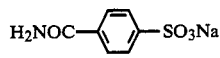

These compounds undergo an addition reaction with polyisocyanate compounds having more than three functional groups as shown by the following formula:

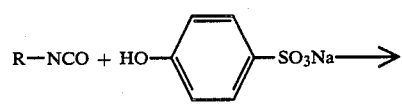

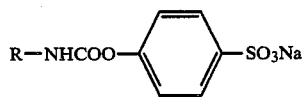

wherein R—NCO represents a polyisocyanate compound having three or more functional groups.

(ii) The method of the introduction of the —COOM group

The compound having a —COOM group and two or more —NCO groups in the molecule may be obtained by reacting a compound having a —COOM group in one molecule and one or more active hydrogen capable of reacting with the —NCO groups and a polyisocyanate compound having three or more functional groups.

The compound having a —COOM group in one molecule and one or more active hydrogen capable of reacting with the —NCO group may be enumerated, for example, by

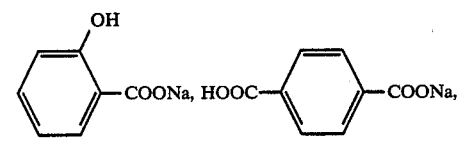

-continued

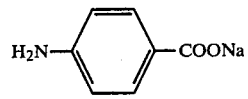

These compounds undergo an addition reaction with a polyisocyanate compound having three or more functional groups as shown for example by the following formula

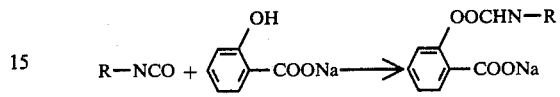

wherein R—NCO represents a polyisocyanate compound with three or more functional groups.

(iii) The method of the introduction of the —OSO₃M group

The compound having a —OSO₃M group and two or more —NCO groups in one molecule may be obtained by neutralizing reaction product of a polyisocyanate compound having three or more functional groups and H₂SO₄ with NaOH or KOH as shown for example by the following formula $$R-NCO + H_2SO_4 \rightarrow R-NHCO-OSO_3H$$

$$R-NHCO-OSO_3H + NaOH \rightarrow R-NHCO-OSO_3Na + H_2O$$

wherein R—NCO represents a polyisocyanate compound having three or more functional groups.

(iv) The method of the introduction of the

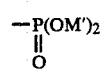

group

The introduction may be effected by neutralizing a reaction product of the polyisocyanate compound with three or more functional groups and H₃PO₃ with NaOH or KOH as shown for example by the formula

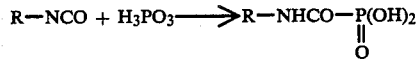

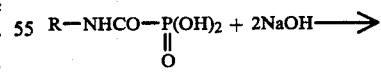

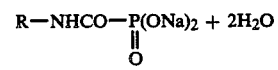

where R—NCO represents a polyisocyanate compound having three or more functional groups.

The aforementioned organic diamines containing the hydrophilic polar group or groups may include an equimolar reaction product of an aliphatic or cycloaliphatic amine and an acid anhydride as shown by a general formula

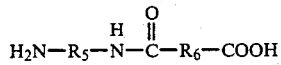

wherein $R_5$, $R_6$ denote hydrocarbon residues with 2 to 12 carbon atoms. The aliphatic or cycloaliphatic diamines may include tetramethylene diamine, hexamethylene diamine, 1,3-diaminomethylcyclohexane, 1,4-diaminomethylcyclohexane, 4,4-diaminodicyclohexylmethane and isophoronediamine. Above all, isophorone diamine is preferred. The aforementioned acid anhydrides may include succinic anhydride, maleic anhydride, phthalic anhydride, hexahydrophthalic anhydride

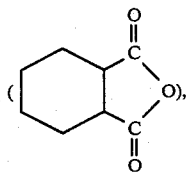

3-methyl-1,2,3,6-tetrahydrophthalic anhydride and 4-methyl-1,2,3,6-tetrahydrophthalic anhydride.

The organic diamine having the unsaturated bonds can be obtained by reacting an organic triamine or an organic diamine with a compound having a functional group or functional groups capable of reacting with an active hydrogen or active hydrogens and a double bond easily opened by radiation such as

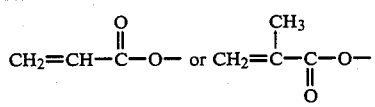

The organic diamine having an unsaturated bond or unsaturated bonds sensitive to radiation and shown by the formula

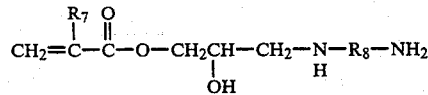

can be obtained by an equimolar reaction of glycidyl acrylate or glycidyl methacrylate and an organic diamine, where $R_7$ represents a hydrogen atom or a methyl group and $R_8$ a divaleric hydrocarbon residue having 2 to 12 carbon atoms.

Also the organic diisocyanate having the unsaturated bond or unsaturated bonds can be obtained by reacting an organic triisocyanate and a compound having an active hydrogen or active hydrogens and a double bond or double bonds sensitive to radiation. The compounds containing the active hydrogen or active hydrogens and the double bond or double bonds sensitive to radiation may include acrylic acid or methacrylic acid, 2-hydroxyethyl ester, 2-hydroxypropyl ester, 2-hydroxybutyl ester, 2-hydroxyoctyl ester, 2-hydroxydodecyl ester, 2-hydroxy-3-chloropropyl ester, 2-hydroxy-3-acryloxypropyl ester, 2-hydroxy-3-methacryloxypropyl ester, 2-hydroxy-3-acetoxypropyl ester, 2-hydroxy-3-chloroacetoxypropyl ester, 2-hydroxy-3-dichloroacetoxypropyl ester, 2-hydroxy-3-trichloroacetoxypropyl ester, 2-hydroxy-3-crotonyloxypropyl ester or 2-hydroxy-3-allyloxy ester thereof, or hydroxy polyacrylates, such as trimethylolpropane diacrylate, trimethylolpropane dimethacrylate, pentaerythritol metacrylate, dipentaerythritol pentaacrylate or dipentaerythritol pentametacrylate. As the aforementioned organic triisocyanate, there may be employed compounds having the formula

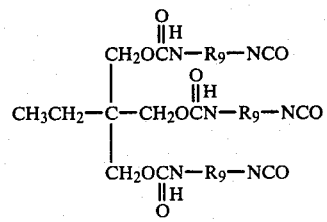

wherein $R_9$ represents a substituent selected from the group consisting of

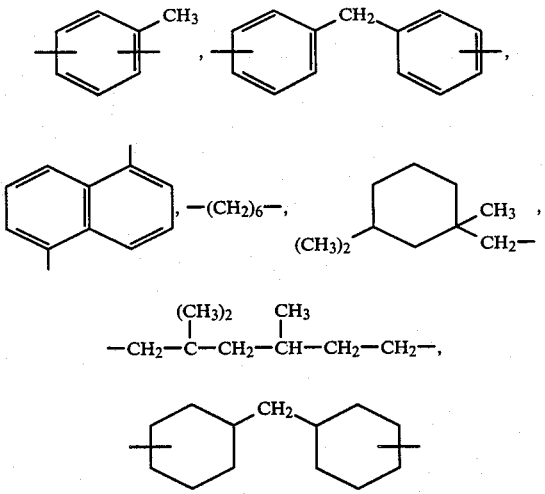

or compounds having the formula

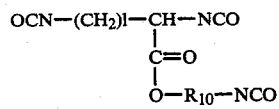

where $R_{10}$ represents a divaleric hydrocarbon residue and $l$ an integer larger than 4. The latter compounds may include 2,6-diisocyanate hexanoic acid-isocyanate ethyl, 2,6-diisocyanate hexanoic acid-3-isocyanate propyl or 2,6-diisocyanate hexanoic acid-2-isocyanate-2-methylethyl. These compounds can be easily prepared by phosgenation of an ester of amino alcohols with lysine.

The diols having the unsaturated bond or unsaturated bonds may be obtained by reacting triols with a compound having a functional group or functional groups capable of reacting with OH-groups, such as epoxy or aziridinyl groups and a double bond or double bonds sensitive to radiation. The compounds having the epoxy or aziridinyl groups and the double bond sensitive to radiation may include the following compounds (a) to (c).

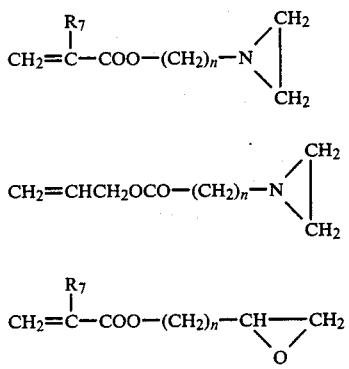

where $R_7$ represents a hydrogen atom or a methyl group and n an integer from 1 to 8. Among these compounds, 2-(1-aziridinyl)ethylmethacrylate, allyl-2-aziridinyl propionate or glycidyl methacrylate are preferred. The aforementioned triols may include (a) glycerin

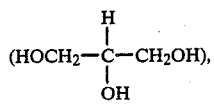

(b) ethylene oxide adducts of glycerin

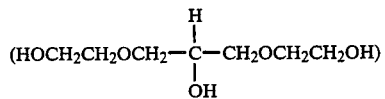

or

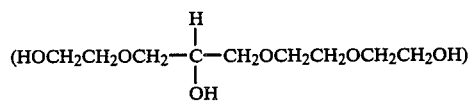

(c) 2-methylpropane-1,2,3-triol

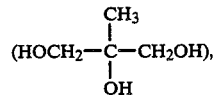

(d) 4,4-bis(2-hydroxyethyl)-2-hydroxypentane

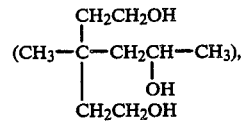

(e) 3-methylpentane-1,3,5-triol

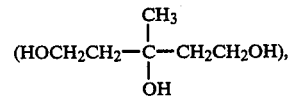

(f) 1,2,6-hexanetriol

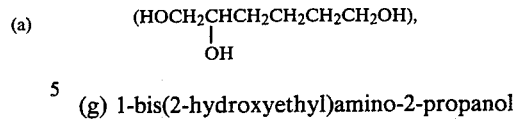

(g) 1-bis(2-hydroxyethyl)amino-2-propanol

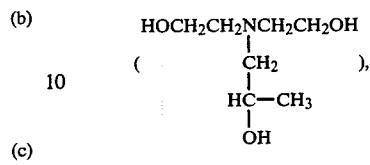

(h) a propylene oxide adduct of diethanolamine

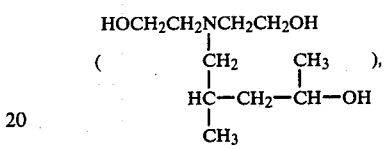

or (i) an ethylene oxide adduct of N-isopropanol diethanolamine

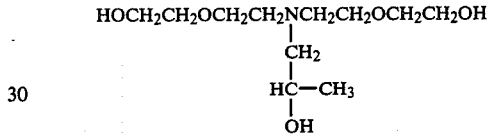

The method (ii) is hereinafter explained. In the method (ii), the compound containing the unsaturated bond or unsaturated bonds sensitive to radiation is previously mixed, as in the method (i), into the starting material of the thermoplastic polyurethane-urea resin. The resulting mixture is subjected to chain prolongation to a preset molecular weight by the polymerization. In this manner, the thermoplastic polyurethane-urea resin, in which the unsaturated bond or unsaturated bonds are introduced into the side chains thereof, is obtained. As the compound having the unsaturated bond or unsaturated bonds sensitive to radiation, there may be employed compounds same as those mentioned in connection with the method (i), that is, the organic diamines containing an unsaturated bond or unsaturated bonds sensitive to radiation, organic diisocyanates containing an unsaturated bond or unsaturated bonds sensitive to radiation or diols containing an unsaturated bond or unsaturated bonds sensitive to radiation.

The terminal OH-groups of the thermoplastic polyurethane-urea resin, into which the unsaturated bond or unsaturated bonds are introduced into the side chains thereof, are then modified by the compound having both chlorine and the hydrophilic polar group or groups in the molecule thereof, such as $ClCH_2CH_2SO_3M$, $ClCH_2CH_2OSO_3M$, $ClCH_2COOM$ or

where M represents a hydrogen atom or an alkali metal and M' a hydrogen atom, an alkali metal or hydrocarbon residue, in the presence of a solvent in which both components are soluble, such as dimethylformamide or dimethylsulfoxide. The reaction proceeds in the presence of an amine such as pyridine, picoline or triethylamine or an epoxy compound such as ethylene oxide or propyrene oxide for elimination of hydrochloric acid and introduction of the hydrophilic polar groups, as shown by the following formulas:

R'—OH+ClCH$_2$CH$_2$SO$_3$M→R'—OCH$_2$CH$_2$SO$_3$M+HCl  (A-1)

R'—OH+ClCH$_2$CH$_2$OSO$_3$M→R'—OCH$_2$CH$_2$OSO$_3$M+HCl  (A-2)

R'—OH+ClCH$_2$COOM→R'—OCH$_2$COOM+HCl  (A-3)

$$R'\text{—OH} + \text{ClCH}_2\overset{\text{O}}{\underset{\|}{P}}(\text{OM}')_2 \longrightarrow R'\text{—OCH}_2\overset{\text{O}}{\underset{\|}{P}}(\text{OM}')_2 + \text{HCl} \quad (A\text{-}4)$$

where R' represents the thermoplastic polyurethane-urea resin into which the unsaturated bonds sensitive to radiation are introduced.

Although small amounts of secondary products are yielded, the following methods may be used for introducing the hydrophilic polar group. Thus, HOCH$_2$CH$_2$SO$_3$M, HOCH$_2$CH$_2$OSO$_3$M, HOCH$_2$COOM or $$\text{HOCH}_2\overset{\text{O}}{\underset{\|}{P}}(\text{OM}')_2$$

is reacted with an equimolar amount of a diisocyanate compound, such as 4,4'-diphenylmethane diisocyanate, tolylene diisocyanate or hexamethylene diisocyanate, and a reaction product between one of the —NCO groups of the diisocyanate and the OH group in the aforementioned molecule is yielded. The thermoplastic polyurethane-urea resin with the hydrophilic polar groups introduced therein may be obtained by the reaction of the —OH group in the thermoplastic polyurethane-urea resin and the remaining —NCO group.

OCN—R"—NCO+HOCH$_2$CH$_2$SO$_3$M→OCN—R"—NHCOOCH$_2$CH$_2$SO$_3$M

R'—OH+OCN—R"—NHCOOCH$_2$CH$_2$SO$_3$M→
R'—OCONH—R"—NHCOOCH$_2$CH$_2$SO$_3$M  (B-1)
OCN—R"—NCO+HOCH$_2$CH$_2$OSO$_3$M→OCN—R"—NHCOOCH$_2$CH$_2$OSO$_3$M

R'—OH+OCN—R"—NHCOOCH$_2$CH$_2$OSO$_3$M→
R'—OCONH—R"—NHCOOCH$_2$CH$_2$OSO$_3$M  (B-2)
OCN—R"—NCO+HOCH$_2$COOM→OCN—R"—NHCOOCH$_2$COOM

R'—OH+OCN—R"—NHCOOCH$_2$COOM→
R'—OCONH—R"—NHCOOCH$_2$COOM  (B-3)

$$\text{OCN—R"—NCO} + \text{HOCH}_2\overset{\text{O}}{\underset{\|}{P}}(\text{OM}')_2 \longrightarrow \quad (B\text{-}4)$$

$$\text{OCN—R"—NHCOOCH}_2\overset{\text{O}}{\underset{\|}{P}}(\text{OM}')_2$$

$$R'\text{—OH} + \text{OCN—R"—NHCOOCH}_2\overset{\text{O}}{\underset{\|}{P}}(\text{OM}')_2 \longrightarrow$$

-continued
$$R'\text{—OCONH—R"—NHCOOCH}_2\overset{\text{O}}{\underset{\|}{P}}(\text{OM}')_2$$

where R' represents a thermoplastic polyurethane-urea resin into which the unsaturated bond or unsaturated bonds sensitive to radiation are introduced, and R" represents a divaleric hydrocarbon residue.

In the method (iii), in contrast to the above described method (ii), the terminal OH-groups of the thermoplastic polyurethane-urea resin into which the hydrophilic polar groups are previously introduced into the side chains thereof are modified by the compound containing an unsaturated bond or unsaturated bonds sensitive to radiation.

Thus, in the method (iii), the compound containing the hydrophilic polar group or groups are previously mixed into the starting material of the thermoplastic polyurethane-urea resin. The starting mixture is polymerized with other starting materials for chain prolongation to a predetermined molecular weight to give a thermoplastic polyurethane-urea resin in which the hydrophilic polar groups are introduced. As the compounds containing the hydrophilic polar group or groups, the compounds already enumerated in connection with the method (i), that is, diols containing the hydrophilic polar group or groups, diamines containing the hydrophilic polar group or groups, or diisocyanates containing the hydrophilic polar group or groups, may be used.

The terminal OH-groups of the thermoplastic polyurethane-urea resin into which the hydrophilic polar group or groups are introduced are modified for introducing the unsaturated bond or unsaturated bonds sensitive to radiation into the resin. In modifying the OH-groups, the compound containing a double bond or double bonds sensitive to radiation and a functional group or functional groups capable of reacting with the active hydrogen or hydrogens of these OH-groups is caused to act directly on these OH-groups, or alternately, the compound containing the active hydrogen or hydrogens and a double bond or double bonds sensitive to radiation and a diisocyanate compound are subjected to an equimolar reaction to give a reaction product between one of the NCO groups of the diisocyanate compound and the active hydrogen and the remaining NCO group of the reaction product is reacted with the terminal OH-groups of the thermoplastic polyurethane-urea resin.

The compounds that can be made to act directly on the terminal OH-groups of the polyurethane-urea resin may include the compounds used for the preparation of the diols having the unsaturated bond or unsaturated bonds as enumerated in connection with the method (i) above. Thus the compounds contaning the epoxy or aziridinyl groups and a double bond or double bonds sensitive to radiation, may be employed. The double bond or double bonds can be introduced into the polyurethane-urea resin by causing these compounds to act directly on the terminal OH-groups in the resin. The reaction process may be schematized by the following formulas:

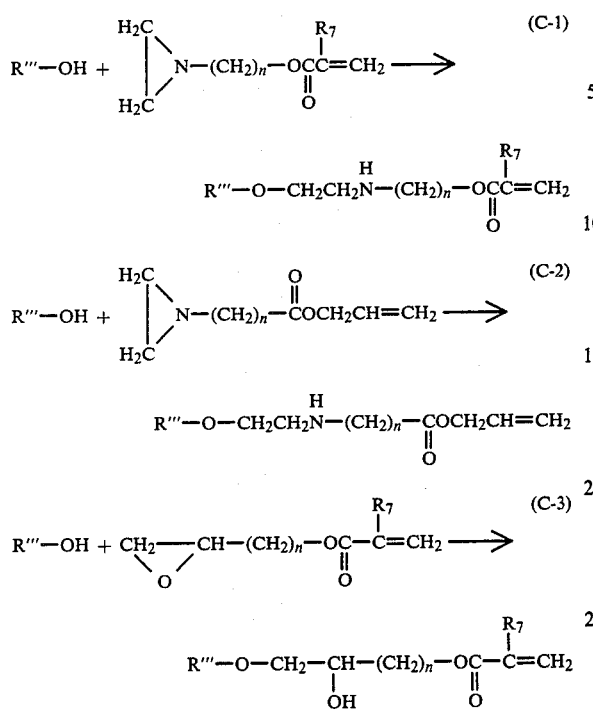

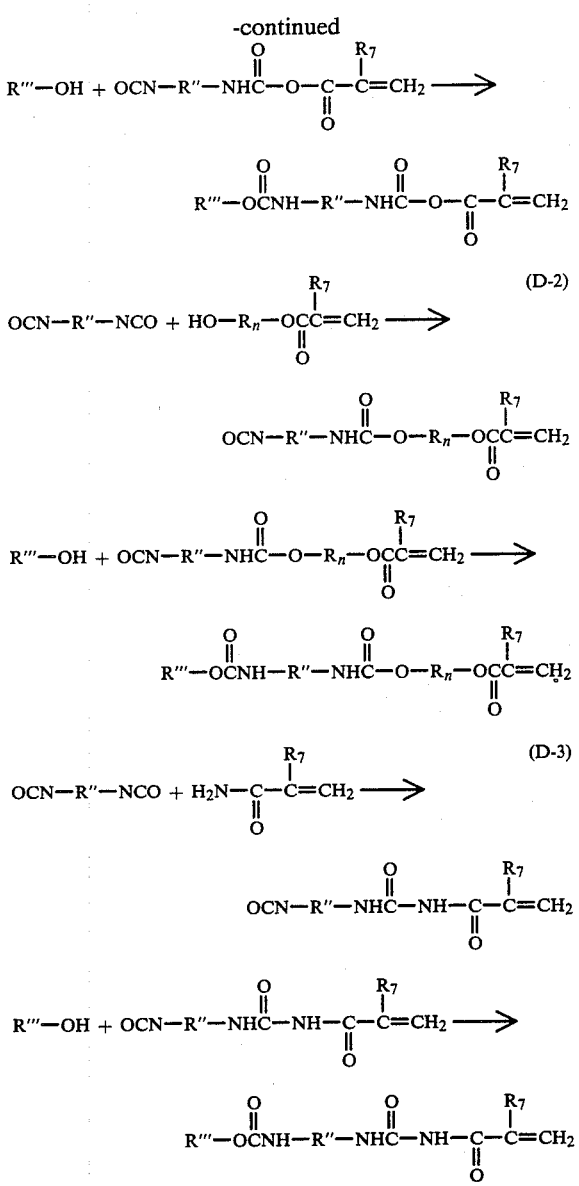

where R''' represents a thermoplastic polyurethane-urea resin in which the hydrophilic polar group or groups are introduced, $R_7$ a hydrogen atom or a methyl group and n an integer from 1 to 8.

The compounds used for introducing the radiation-sensitive double bond or double bonds into the resin through the aforementioned isocyanate compounds and containing both the active hydrogen or hydrogens and radiation-sensitive double bond or double bonds may include acrylic acid, methacrylic acid, hydroxyl alkyl esters thereof, such as hydroxymethyl ester, 2-hydroxyethyl ester, 3-hydroxypropyl ester, 4-hydroxybutyl ester or 8-hydroxyoctyl ester, acrylamide, methacrylamide, N-methylolacrylamide or N-methylolmethacrylamide. The aforementioned diisocyanate compounds may include aliphatic diisocyanate, isophorone diisocyanate, dicyclohexylmethane diisocyanate or methylcyclohexane diisocyanate, or aromatic diisocyanates such as m-phenylene diisocyanate, p-phenylene diisocyanate, 2,4-tolylene diisocyanate, 2,6-tolylene diisocyanate, 1,3-xylylene diisocyanate, 1,4-xylylene diisocyanate, 1,5-naphthalene diisocyanate, 4,4-diphenylmethane diisocyanate, 3,3'-dimethyl-4,4'-diphenylmethane diisocyanate, 3,3'-dimethylbiphenylene diisocyanate, ditolylene diisocyanate or dianisidine diisocyanate. The reaction proceeds as schematized by the following formulas:

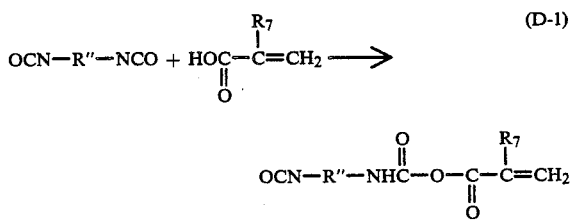

wherein R''' represents thermoplastic polyurethane-urea resin in which hydrophilic polar group or groups are introduced, R'' and $R_n$ represent divaleric hydrocarbon residues and $R_7$ represents a hydrogen atom or a methyl group.

The thermoplastic polyurethane-urea resin in which unsaturated bonds sensitive to radiation in the above described manner may be used in combination with other thermoplastic, thermosetting or reactive resins. Preferably, the thermoplastic polyurethane-urea resin is present in an amount higher than 10 weight percent of the total amount of the binder of the magnetic layer. An improvement in anti-blocking properties of the magnetic recording medium can hardly be expected with the amount of the thermoplastic polyurethane-urea resin less than 10 weight percent of the total binder. Most preferably, the polyurethane-urea resin should be present in an amount higher than 40 weight percent of the total binder. Preferably, the thermoplastic resin has a softening temperature lower than 150° C., an average molecule weight ranging from 10000 to 200000 and a polymerization degree ranging from about 200 to 2000.

Preferred thermoplastic resins may include a vinyl chloride-vinyl acetate copolymer, vinyl chloride-vinylidene chloride copolymer, vinyl chloride-acrylonitrile copolymer, acrylic acid ester-acrylonitrile copolymer, thermoplastic polyurethane elastomer, polyvinyl fluoride, vinylidene chloride-acrylonitrile copolymer, butadiene-acrylonitrile copolymer, polyamide resin, polyvinyl butyral, cellulose derivatives, polyester resins or polybutadiene or the like synthetic rubber type thermoplastic resin. The thermosetting or reactive resins may include phenolic resin, epoxy resin, cured polyurethane resin, melamine resin, alkyd resin, silicon resin, acrylic reactive resin, epoxy-polyamide resin, nitrocellulose-melamine resin, a high molecular weight polyester resin-isocyanate prepolymer mixture, a methacrylate copolymer-diisocyanate prepolymer mixture, a polyester polyol-polyisocyanate mixture, urea formaldehyde resin, a low molecular weight glycol-high molecular weight diol-triphenylmethane triisocyanate mixture, a polyamine resin, or a mixture thereof.

The magnetic layer is formed by dispersing ferromagnetic powders in the binder, dissolving the dispersant in an organic solvent and coating the solution on a nonmagnetic substrate.

The ferromagnetic powders employed in accordance with the present invention may include ferromagnetic iron oxide particles, ferromagnetic chromium dioxide or ferromagnetic alloy powders.

The aforementioned ferromagnetic iron oxide particles may include those represented by the general formula FeOx wherein X is in the range of $1.33 \leq X \leq 1.50$, that is, maghemite (gamma-$Fe_2O_3$, X=1.50) and magnetite ($Fe_3O_4$, X=1.33) and solid solutions thereof (FeOx, $1.33 < X < 1.50$). These iron oxides, such as gamma-$Fe_2O_3$ or $Fe_3O_4$, are usually obtained by the following process. An alkali is added to a solution of ferrous salts to give a ferrous hydroxide which is oxidized by air blown thereinto at a preset temperature. The resulting needle-like iron oxide hydrate is used as the starting material and heated at 250° C. to 400° C. in air for dehydration. The iron oxide is then reduced by heating at 300° to 450° C. in a reducing atmosphere to give needle-like magnetite particles, which may optionally be re-oxidized at 200° to 350° C. to give needle-like maghemite (gamma-$Fe_2O_3$). If desired, cobalt can be added to the ferromagnetic iron oxides for improving the coercive force. The cobalt-containing magnetic iron oxides may be classified into two types, namely, the doped type and adsorbed type. The Co-doped iron oxide particles are produced by any of the following methods.

(i) Ferrous hydroxide which contains cobalt hydroxide is treated hydrothermally in an alkaline atmosphere and the resulting pulverulent material is subjected to reduction-oxidation.

(ii) In preparing the goethite, a cobalt salt solution is previously added and the cobalt-containing goethite is prepared and subjected to reduction-oxidation while the pH is adjusted to a suitable value.

(iii) The reaction similar to that in (ii) is carried out on the goethite nuclei free of Co for allowing the growth of the Co-containing goethite which is then subjected to reduction oxidation.

(iv) The needle-like goethite or maghemite is superficially treated in a Co-containing alkaline aqueous solution for adsorption of the cobalt compound on the surface of the needle-like goethite or maghemite, which is then subjected to reduction-oxidation or heat treatment at a higher temperature. The Co-adsorbed type iron oxide magnetic particles may be prepared by a process in which a cobalt salt and needle-like magnetic iron oxides are mixed in an alkaline aqueous solution under heating for adsorbing the cobalt compound, e.g. cobalt hydroxide, the resulting product is taken out after washing with water and drying, and the dried product is heat-treated under a non-reducing atmosphere such as air or a nitrogen gas. As compared to the Co-doped particles, the Co-adsorbed particles have such a feature that it has superior transfer and demagnetizing properties when used in the preparation of the magnetic tape.

The aforementioned ferromagnetic chromium dioxide $CrO_2$ may be optionally mixed with at least one of the additives effective to improve the coercive force, such as Ru, Sn, Te, Sb, Fe, Ti, V or Mn. Basically, chromium dioxide may be obtained by thermally cracking chromium trioxide ($CrO_3$) in the presence of water at a pressure of at least 500 atm and a temperature of 400° to 525° C. It is also known to crack chromium trioxide ($CrO_3$) at a temperature of 250° to 375° C. in the presence not only of oxygen but also of nitrogen monoxide (NO). The ferromagnetic metal or alloy powders may include Fe, Co, Ni, Fe-Co, Fe-Ni or Fe-Co-Ni to which metal components such as Al, Si, Ti, Cr, Mn, Cu or Zn may be added for improving various physical properties. These ferromagnetic metal or alloy powders may be produced by any of the following methods.

(i) The organic acid salts (mainly oxalates) of ferromagnetic metals and alloys are thermally cracked and reduced by a reducing gas.

(ii) The needle-like iron oxyhydroxide with or without Co contents or the needle-like magnetic iron oxide is reduced in a reducing gas.

(iii) The ferromagnetic metals or alloys are vaporized in an inert gas atmosphere.

(iv) The metal carbonyl compounds are subjected to cracking.

(v) The powders of ferromagnetic metals are electrodeposited by mercury electrolysis, after which mercury is separated and removed.

(vi) The ferromagnetic metal salts are subjected in a solution to a wet reduction with sodium hydrophosphite or sodium boron hydride.

In addition to the aforementioned binder and the fine powders of the ferromagnetic materials, additives such as dispersants, lubricants, abrasives, antistatic agents or antiseptics may also be incorporated into the magnetic layer.

As the aforementioned dispersants (pigment wetting agents), fatty acids with 12 to 18 carbon atoms ($R_7COOH$, wherein $R_7$ represents alkyl or alkenyl groups having 11 to 17 carbon atoms, such as caprylic acid, capric acid, lauric acid, myristic acid, palmitinic acid, stearic acid, oleic acid, elaidic acid, linolic acid or stearolic acid; metal soaps consisting of alkali metal salts (such as Li, Na or K salts) or alkali earth metal salts (such as Mg, Ca or Ba salts) of the aforementioned fatty acids; fluorine compounds of the esters of the aforementioned fatty acids; amides of the aforementioned fatty acids; poly-alkylenoxide alkyl-phosphoric esters; or tri-alkyl-poly-olefin oxy-quaternary ammonium salt, where alkyl has 1 to 5 carbon atoms, and olefin may be ethylene or propyrene, may be used. Higher alcohols with more than 12 carbon atoms and sulfuric acid esters may also be employed. These dispersants may be used in an amount of 0.5 to 20 parts by weight to 100 parts by weight of the binder.

As the aforementioned lubricants, a silicon oil such as dialkylpolysiloxane (with 1 to 5 carbon atoms in the alkyl part), dialcoxypolysiloxane (with 1 to 4 carbon atoms in the alcoxy component), monoalkyl-monoalcoxypolysiloxane (with 1 to 5 carbon atoms in the alkyl part and 1 to 4 carbon atoms in the alcoxy part), phenylpolysiloxane or fluoroalkylpolysiloxane (with 1 to 5 carbon atoms in the alkyl part), fine powders of the electrically conductive material such as graphite, fine powders of the inorganic materials such as molybdenum disulfide wolfram disulfide, fine powders of plastics materials such as polyethylene, polypropyrene, polyethylene-vinyl chloride copolymer or polytetrafluoroethylene, alfa-olefin polymers, unsaturated aliphatic hydrocarbons that are liquid at ambient temperature (compounds having an alfa-olefin double bond attached to the terminal carbon, with about 20 carbon atoms), fatty acid esters formed by a monobasic fatty acid with 12 to 20 carbons and a monohydric alcohol with 3 to 12 carbons) and fluorocarbons, may be employed. These lubricants may be used in an amount of 0.2 to 20 parts by weight to 100 parts by weight of the binder.

As the aforementioned abrasives, those commonly used materials such as molten alumina, silicon carbide, chromium oxide ($Cr_2O_3$), corrundum, artificial corrundum, diamond, artificial diamond, garnet or emery (consisting essentially of corrundum and magnetite), may be employed. Preferably, these abrasives should have Mohs hardness higher than 5 and an average particle size in the range of 0.05 to 5 microns and especially in the range of 0.1 to 2 microns. These abrasives may be used in an amount of 0.5 to 20 parts by weight to 100 parts by weight of the binder.

As the aforementioned antistatic agents, fine powders of the electrically conductive materials, such as carbon black or carbon black graft polymer, natural surfactants such as saponin, nonionic surfactants derived from alkylene oxides, glycerin or glycidols, higher alkylamines, quaternary ammonium salts, heterocyclic compounds such as pyridine, cationic surfactants such as phosphonium, anionic surfactants containing carboxylic acid residues, sulfonic acid residues, phosphoric acid residues or acidic groups such as sulfuric acid ester or phosphoric acid ester residues, or amphoteric surfactants such as amino acids, aminosulfonic acids or surfuric acid or phosphoric acid esters of amino alcohols, may be employed. The aforementioned fine powders of the electrically conductive materials and surfactants may be used in amounts of 0.2 to 20 parts by weight and 0.1 to 10 parts by weight to 100 parts by weight of the binder, respectively. These surfactants may be used either singly or as a mixture, as desired. While these surfactants are used as antistatic agents, they may also be used for other purposes, as for example for improving dispersion or magnetic properties or lubricity or as coating assistive agents.

As the aforementioned anti-corrosive agents, phosphoric acid, sulfamide, guanidine, pyridine, amine, urea, zinc chromate, calcium chromate or strontium chromate, can be used. The anti-corrosive effects can be improved especially when vaporizable anti-corrosive agents (organic or inorganic acid salts of amines, amides or imides) such as dicyclohexylamine nitrate, cyclohexylamine chromate, diisopropylamine nitrite, diethanolamine phosphate, cyclohexylammonium carbonate, hexamethylenediamine carbonate, propyrenediamine stearate, guanidine carbonate, triethanolaminenitrite or morpholine stearate are employed. These anti-corrosive agents can be used in an amount of 0.1 to 20 parts by weight to 100 parts by weight of the ferromagnetic fine powders.

The components of the magnetic layer are dissolved in an organic solvent to give a magnetic paint which is then coated on the non-magnetic substrate or base material. The solvent for the magnetic paint may be enumerated by ketones such as acetone, methylisobutylketone or cyclohexanone, esters such as methyl acetate, ethyl acetate, butyl acetate, ethyl lactate or ethylene glycol monoethyl ether acetate, glycol ethers such as glycol dimethyl ether, glycol monoethyl ether or dioxane, aromatic hydrocarbons such as benzene, toluene or xylene, aliphatic hydrocarbons such as hexane or heptane, or chlorinated hydrocarbons such as methylene chloride, ethylene chloride, carbon tetrachloride, chloroform, ethylene chlorohydrine or dichlorobenzene. As the material for the non-magnetic substrate, there may be employed, in addition to polyesters such as polyethylene terephthalate or polyethylene-2,6-naphthalate, polyolefins such as polyethylene or polypropyrene, cellulose derivatives such as cellulose triacetate, cellulose diacetate, cellulose acetate butylate or cellulose acetate propionate, vinyl resin such as polyvinyl chloride or polyvinylidene chloride, or plastics such as polycarbonate, polyimide or polyamideimide, non-magnetic metals such as aluminium, copper, tin, zinc or non-magnetic alloys containing these metals, ceramics such as glass, porcelain or china, paper with or without coating or lamination of balata, or alfa-polyolefins with 2 to 10 carbon atoms, such as polyethylene, polypropyrene or ethylene-butene copolymers. The non-magnetic substrate may be in the form of a film, tape, disk, card or a drum, as desired.

The magnetic paint formulated in the above described manner is coated as conventionally on a non-magnetic substrate and dried. The resulting film is calendered and cured with radiation. As such radiation, ionizing radiation such as neutron or gamma rays may be used in addition to the electron beam, which is most desirable for industrial application. Preferably, the dose ranges from about 1 to 10 Mrad and most preferably it ranges from about 2 to 7 Mrad. When an electron beam accelerator is used for irradiation, its irradiation energy or accelerating voltage is preferably higher than about 100 KeV. It should be noted that irradiation may be performed prior to calendering.

The thermoplastic polyurethane-urea resin according to the present invention may also be employed as the binder for the back-coat layer, which is provided on the opposite side of the substrate with respect to the magnetic layer for preventing loose winding or preventing electric charging.

In forming the back-coat layer, the powders of non-magnetic materials are disposed in the binder, and the resulting dispersion is dissolved in an inorganic solvent to give a back-coat layer, which is then coated on the opposite surface of the substrate with respect to the magnetic layer.

As the binder, the thermoplastic polyurethane-urea resin according to the present invention can be employed in conjunction with the aforementioned thermoplastic resin, thermosetting or reactive resin.

The organic solvents enumerated hereinabove may also be employed.

The powders of non-magnetic materials may include carbon for affording electrical conductivity to the powders, such as furnace carbon, channel carbon, acetylene carbon, thermal carbon or lamp carbon, preferably furnace carbon or thermal carbon, and inorganic pigments for controlling surface roughness and improving durability, such as gamma-FeOOH, gamma-$Fe_2O_3$, $Cr_2O_3$, $TiO_2$, ZnO, SiO, $SiO_2.2H_2O$, $Al_2O_3.2SiO_2.2H_2O$, $3MgO.4SiO_2.H_2O$, $MgCO_3.Mg(OH)_2.3H_2O$, $Al_2O_3$ or $Sb_2O_3$.

Furthermore, lubricants or the like may be incorporated into the back-coat layer, if so desired. As such lubricants, a silicon oil such as dialkylpolysiloxane with 1 to 5 carbon atoms in the alkyl part, dialcoxypolysiloxane with 1 to 4 carbon atoms in the alcoxy part, monoalkyl monoalcoxy polysiloxane with 1 to 5 carbon atoms in the alkyl part and 1 to 4 carbon atoms in the alcoxy part, phenylpolysiloxane or fluoroalkylpolysiloxane with 1 to 5 carbon atoms in the alkyl part, fine powders of the electrically conductive materials, such as graphite, fine powders of inorganic materials such as molybdenum disulfide or wolfram disulfide, fine powders of plastics such as polyethylene, polypropyrene, polyethylene-vinyl chloride copolymer or polytetrafluoroethylene, alfa-olefin polymers, unsaturated aliphatic hydrocarbons that are liquid at ambient temperature (compounds with an n-olefin double bond or n-olefin double bonds attached to a terminal carbon or terminal carbons, with about 20 carbons), fatty acid esters consisting of monobasic fatty acids with 12 to 20 carbons and monohydric alcohols with 3 to 12 carbons, or fluorocarbons, may be employed. These lubricants may be employed in an amount of 0.2 to 20 parts by weight to 100 parts by weight of the binder.

The back-coat can be applied not only to the so-called coat type magnetic recording medium in which the magnetic paint is coated on the non-magnetic substrate to give the magnetic layer, but also to the thin ferromagnetic metal film type magnetic recording medium (so-called metallized tape) in which magnetic metals or alloys are vaporized and deposited on the non-magnetic substrate to give the magnetic layer.

Any metal or alloy materials capable of forming ferromagnetic thin films can be uesed, such as metals, e.g. iron (Fe), cobalt (Co) or nickel (Ni) or alloys e.g. Co-Ni, Fe-Co, Fe-Ni or Co-Ni-Fe-B alloys.

The ferromagnetic thin film can be applied, for example, by the vacuum deposition process, the ion plating process, or the sputtering process.

In the vacuum metallizing process, the magnetic metal materials are vaporized by resistance heating, high frequency heating or electron beam heating under a vacuum of $10^{-4}$ to $10^{-3}$ Torr for depositing vaporized magnetic metal materials on the non-magnetic substrate. The process is classified into the oblique type deposition and the perpendicular type deposition. The oblique deposition is carried out in such a manner that the ferromagnetic material is deposited obliquely on the non-magnetic substrate in order to provide an elevated coercive force. The process may be effected in an oxygen atmosphere in order to further elevate the coercive force. In the perpendicular deposition process, for improving deposition efficiency and providing an elevated coercive force, the undercoat layer of bismuth (Bi), thallium (Tl), antimony (Sb), gallium (Ga), germanium (Ge) or the like metal is formed on the non-magnetic substrate and the magnetic metal material is deposited perpendicularly on the undercoat layer.

In the ion plating method, DC glow discharge or RF glow discharge is induced in an atmosphere consisting essentially of an inert gas, usually an argon gas, and maintained at a vacuum of $10^{-4}$ to $10^{-4}$ Torr for vaporizing the metal in the course of electrical discharge.

In the sputtering process, a glow discharge is induced in an atmosphere consisting essentially of argon at a vacuum of $10^{-3}$ to $10^{-1}$ Torr and the argon ions thus produced are impinged on the target to strike out the atoms of the target material from the target surface. The process may be classified into a DC double pole process, DC triple pole process and a high frequency process according to the method of inducing the glow discharge. There is also known the magnetron sputtering method resorting to magnetron discharge.

It will be seen from the foregoing that the magnetic recording medium of the present invention makes use of the thermoplastic polyurethane-urea resin in which an unsaturated bond or unsaturated bonds sensitive to radiation are introduced in such a manner that the magnetic layer can be cured by irradiation for a very short time such as several seconds with resulting reduction in manufacture time and the heat-treatment step can be dispensed with so that deterioration in the shape is prevented positively. There is no constraint concerned with the pot life because it is unnecessary to use the curing agent for curing. In addition, the advantage proper to the thermoplastic polyurethane resin is not lost so that an improvement is achieved in thermal and anti-blocking characteristics as well as durability of the magnetic layer.

Since the hydrophilic polar group or groups introduced into the thermoplastic polyurethane-urea resin exhibit a superior affinity with the ferromagnetic powders, an improvement is achieved in dispersibility of the ferromagnetic powders and favorable results may be obtained not only in the filling properties of the ferromagnetic powders but also in electromagnetic conversion characteristics and running durability such as resistance to tape damage or powder debris.

The present invention will be explained further by referring to certain specific examples. It is to be noted that these examples are given only by way of illustration and are not intended for limiting the scope of the invention.

SYNTHESIS EXAMPLE 1

1000 g (1.0 mol) of polybutylene adipate with the molecular weight of 1000 and 444 g (2.0 mols) of isophorone diisocyanate were charged into a reaction vessel fitted with a stirring propeller, thermometer, condenser and a heating/cooling unit, for carrying out the reaction at 110° C. for 4 hours. To the reaction product was then added 216 g of methylethylketone, and the mixture was cooled to ambient temperature.

In a separate reaction vessel, 163 g (0.96 mol) of isophorone diamine, 68 g (0.48 mol) of glycidyl methacrylate and 1 g of hydroquinone as polymerization inhibitor were charged, and the reaction mixture was reacted for 2 hours at ambient temperature to 50° C. 1742 g of cyclohexanone was added to the reaction product to give an organic diamine solution containing unsaturated bonds sensitive to radiation

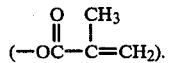

This organic diamine solution was a mixture consisting of 50 mol % of isophorone diamine and 50 mol % of an equimolar reaction product of glycidyl methacrylate and isophorone diamine.

The organic diamine solution was charged into the firstly stated reaction vessel for reaction. With progress in the reaction, the reaction solution was increased in viscosity. When a predetermined viscosity was reached, an amount of glycol corresponding to the concentration of the residual NCO-groups was added to the solution for modifying the terminal groups into the OH-groups. The resulting resin solution was a transparent solution with 30% solid contents, a viscosity of 5000 CP/25° C. and 0.29 m mol/g of

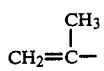

groups, and the liquid was stable upon prolonged storage.

In accordance with the above described synthetic method, samples B to D were prepared by using various mol numbers of polybutylene adipate and isophorone diisocyanate and various amounts of the organic diamine solution.

SYNTHESIS EXAMPLE 2

1000 g (1.0 mol) of polybutylene adipate with a molecular weight of 1000, 104 g (10 mols) of neopentyl glycol and 750 g (3.0 mols) of 4,4-diphenylmethane diisocyanate were charged into a reaction vessel fitted with an stirring propeller, thermometer, condenser and a heating/cooling unit, and the mixture was reacted for 4 hours at 75° to 80° C. 1854 g of methylethylketone was added to the reaction product, and the resulting mixture was cooled to ambient temperature.

In a separate reaction vessel, 167 g (0.98 mol) of isophorone diamine and 42 g (0.29 mol) of glycidyl methacrylate were charged and reacted for 2 hours at ambient temperature to 50° C. 2500 g of cyclohexanone and 460 g of methylethylketone were added to the reaction product to give an organic diamine solution containing unsaturated bonds sensitive to radiation.

This organic diamine solution was charged into the firstly stated reaction vessel for reaction. With progress in the reaction, the reaction solution was increased in viscosity. When a predetermined viscosity was reached, an amount of glycol corresponding to the concentration of the residual NCO-groups was added to the solution for modifying the terminal groups into OH-groups.

In accordance with the above synthetic method, samples E, F were prepared by using various mol numbers of polybutylene adipate, neopentyl glycol and 4,4-diphenyl methane diisocyanate and various amounts of the organic diamine solution.

SYNTHESIS EXAMPLE 3

The reaction vessel fitted with a stirring propeller, thermometer, condenser and a heating/cooling unit was charged with polybutylene adipate (molecular weight, 1000) and isophorone diisocyanate (in an amount of two mols to one of polybutylene adipate) and the mixture was subjected to a reaction at 110° C. for 4 hours. Then, 2166 g of methylethylketone was added to the reaction product, and the mixture was cooled to ambient temperature.

A separate reaction vessel was charged with isophorone diamine, glycidyl methacrylate and hydroquinone (polymerization inhibitor) and the mixture was subjected to a reaction for 2 hours at room temperature to 50° C. To the reaction product was added cyclohexanone to give an organic diamine solution containing unsaturated bonds sensitive to radiation

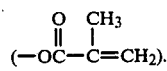

To this solution was added phthalic anhydride to effect the reaction for 1 hour at room temperature to 50° C. to give a mixed solution of an equimolar reaction product of glycidyl methacrylate and isophorone diamine (an organic diamine containing unsaturated bonds sensitive to radiation) and an equimolar reaction product of phthalic anhydride and isophorone diamine (an organic diamine containing hydrophilic polar groups).

This mixed solution was charged into the firstly mentioned reaction vessel for reaction. With progress in the reaction, the reaction solution increased in viscosity. When a predetermined viscosity was reached, an amount of glycol corresponding to the concentration of the residual NCO groups was added to the solution for modifying the terminal groups into the OH-groups.

In accordance with the above described synthetic method, samples H to K of the thermoplastic polyurethane-urea resin containing —COOH and

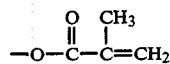

groups were synthesized by using various mol numbers of polybutylene adipate, isophorone diisocyanate, isophorone diamine, glycidyl methacrylate and phthalic acid.

SYNTHESIS EXAMPLE 4

A reaction vessel fitted with a stirring propeller, thermometer, condenser and a heating/cooling unit was charged with polycaprolactone diol of any desired molecular weight, neopentyl glycol, diethyl-N,N-bis(2-hydroxyethyl)aminomethyl phosphate (a phosphate group containing diol), 4,4-diphenylmethane diisocyanate and methylethylketone, and the reaction was carried out at 75° to 80° C. for 4 hours. To the reaction product was added methylethylketone and the resulting mixture was cooled to close to the ambient temperature.

A separate reaction vessel was charged with isophorone diamine, glycidyl methacrylate and hydroquinone (polymerization inhibitor) and the reaction was carried out at ambient temperature to 50° C. for 2 hours. To the resulting reaction product was added cyclohexanone to give an organic diamine solution containing unsaturated bonds sensitive to radiation

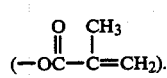

This organic diamine solution was a mixture of an equimolar reaction product of isophorone diamine and glycidyl methacrylate, and isophorone diamine.

This organic diamine solution was charged into the firstly mentioned reaction vessel for reaction. With progress in the reaction, the solution increased in viscosity. When the viscosity reached a predetermined value, an amount of glycol corresponding to the concentration of the remaining NCO groups was added for converting the terminal groups into the OH-groups.

In accordance with the above described synthetic methods, samples L to N of the thermoplastic polyurethane-urea resin containing

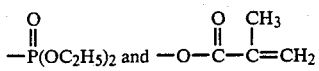

groups were prepared by using various mol numbers of polycaprolactone diol, neopentyl glycol, diethyl-N,N-bis(2-hydroxyethyl)aminomethyl phosphonate, 4,4'-diphenylmethane diisocyanate, isophorane diamine and glycidyl methacrylate.

SYNTHESIS EXAMPLE 5

A reaction vessel fitted with a thermometer, stirring propeller and a condenser was charged with dimethyl terephthalate, 5-sodium-sulfo-dimethyl-isophthalate, ethylene glycol, neopentyl glycol, zinc acetate and sodium acetate, and an ester exchange reaction was carried out at 140° to 220° C. for 3 hours. To the reaction product was added sebacic acid and the reaction was carried out at 210° to 250° C. for 2 hours. The reaction system was reduced in pressure to 20 mmHg in 30 minutes and polycondensation was carried out at 5 to 20 mmHg and 250° C. for 50 minutes to give a diol containing —SO$_3$Na groups.

The —SO$_3$Na-group containing diol was subjected to chain prolongation by using 4,4-diphenylmethane diisocyanate in toluene and methylisobutylketone for converting the terminal groups into the —NCO groups.

In a separate vessel, isophorone diamine, glycidyl methacrylate and hydroquinone as polymerization inhibitor were charged and reacted at ambient temperature to 50° C. for 2 hours. To the resulting reaction product was added cyclohexanone to give an organic diamine solution containing unsaturated bonds sensitive to irradiation

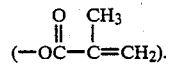

This organic diamine solution was a mixture of the equimolar reaction product of isophorone diamine and glycidyl methacrylate, and isophorone diamine.

This organic diamine solution was charged into the firstly stated reaction vessel for reaction. With the progress in the reaction, the solution increased in viscosity. When a predetermined viscosity was reached, an amount of glycol corresponding to the concentration of the remaining NCO groups was added to the solution for converting the terminal groups into OH-groups.

In accordance with the above described synthetic method, samples O to R of the thermoplastic polyurethane-urea resin containing —SO$_3$Na and

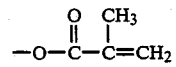

groups were synthesized by using various mol numbers of the —SO$_3$Na-group containing diol, 4,4-diphenylmethane diisocyanate, isophorone diamine and glycidyl methacrylate.

SYNTHESIS EXAMPLE 6

In a reaction vessel having a stirring propeller, thermometer and a condenser, terephthalic acid, isophthalic acid, neopentyl glycol and glycerin were charged and subjected to polycondensation to give a polyester polyol having a molecular weight ranging from about 1500 to 3000 and having OH-groups in the side chain and terminal parts thereof.

This polyester polyol was subjected to chain prolongation by using 4,4-diphenyl methane diisocyanate in toluene and methyl isobutyl ketone for modifying the terminal groups into OH-groups.

In a separate reaction vessel, isophorone diamine, glycidyl methacrylate and hydroquinone as polymerization inhibitor were charged and subjected to a reaction at room temperature to 50° C. for 2 hours. To the resulting reaction product was added cyclohexanone to give an organic diamine solution containing

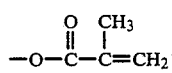

groups. This organic diamine solution was a mixture of isophorone diamine and an equimolar reaction product of isophorone diamine and glycidyl methacrylate.

This organic diamine solution was charged into the firstly stated reaction vessel for reaction. With progress in the reaction, the solution showed an increase in viscosity. When a predetermined viscosity was reached, an amount of glycol corresponding to the concentration of the remaining —NCO groups was added to the solution for converting the terminal groups into OH-groups.

The reaction product was reacted further with ClCH$_2$CH$_2$OSO$_3$Na in the presence of pyridine for introducing —OSO$_3$Na groups into the OH-groups in the side chains.

In accordance with the above described synthetic method, samples S and T of the thermoplastic polyurethane-urea resin containing —OSO$_3$Na groups were synthesized by using various mol numbers of polyester polyol, 4,4-diphenylmethane diisocyanate, isophorone diamine and glycidyl methacrylate.

The characteristics of the resin obtained in the Synthesis Examples 1 and 2 are shown in Table 1, while those of the resin obtained in the Synthesis Examples 3 to 6 are shown in Table 2.

In the Table 1, the sample A is synthesized from 1000 g (1.0 mol) of polybutylene adipate, 18 g (0.2 mol) of 1,4-butanediol and 300 g (1.2 mol) of 4,4-diphenylmethane diisocyanate, and represents a polyester polyurethane resin free of urea groups and showing a concentration in the urethane groups of about 1.8 m mol/g.

Also, in the Table 2, the sample G is synthesized from 1000 g (1.0 mol) of polybutylene adipate, 18 g (0.2 mol) of 1.4-butanediol and 300 g (1.2 mol) of 4,4'-diphenylmethane diisocyanate, and represents a polyester-polyurethane resin free of urea groups and showing a concentration in the urethane groups of approximately 1.8 m mol/g. The sample U represents a thermoplastic polyurethane-urea resin in which only the unsaturated bonds sensitive to radiation

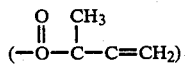

are introduced in the same manner as in the Synthesis Example 1.

It should also be noted that, in this Table 1, the glass transition temperature was measured by using a torsional blade analysis (manufactured by Rigaku Denki KK) in accordance with the TBA process, and that, in measuring the softening temperature, the specimen was cut with a JIS No. 2 dumbell and, with a load equivalent to 5 g/100 μm applied thereto, the temperature was increased at the rate of 5° C. per minute, the temperature at which the specimen underwent a rapid increase in deformation was noted and used as the softening temperature.

TABLE 1

| Samples | Conc. of urethane groups (mmol/g) | Conc. of urea groups (mmol/g) | Conc. of urethane + urea groups (mmol/g) | Conc. of urea groups / Conc. of urethane groups | Conc. of unsaturated bonds sensitive to radiation (mmol/g) | Glass transition temp. (°C.) | Softening temp. (°C.) | Number average molecular weight × $10^4$ |
|---|---|---|---|---|---|---|---|---|
| A | 1.8 | 0 | 1.8 | 0 | 0 | −30 | 50 | 4.5 |
| B | 1.4 | 0.7 | 2.1 | 0.50 | 0.60 | −22 | 95 | 1.2 |
| C | 1.5 | 0.8 | 2.3 | 0.53 | 0.55 | −18 | 110 | 1.1 |
| D | 1.7 | 0.9 | 2.6 | 0.53 | 0.61 | −15 | 135 | 1.12 |
| E | 1.6 | 0.7 | 2.3 | 0.44 | 0.58 | −17 | 108 | 4.0 |
| F | 1.5 | 0.9 | 2.4 | 0.60 | 0.30 | −19 | 110 | 1.1 |

TABLE 2

| Samples | Conc. of urethane groups (mmol/g) | Conc. of urea groups (mmol/g) | Conc. of urethane + urea groups (mmol/g) | Conc. of unsaturated bonds sensitive to radiation (mmol/g) | Conc. of hydrophilic polar groups (mmol/g) | Number average molecular weight × $10^4$ | Softening temp. (°C.) | Glass transition temp. (°C.) |
|---|---|---|---|---|---|---|---|---|
| G | 1.8 | 0 | 1.8 | 0 | 0 | 2.5 | 50 | −35 |
| H | 1.42 | 0.99 | 2.37 | 0.50 | 0.06 | 2.1 | 107 | −20 |
| I | 1.5 | 0.75 | 2.15 | 0.53 | 0.15 | 2.4 | 88 | −25 |
| J | 1.0 | 1.2 | 2.2 | 0.51 | 0.35 | 2.2 | 92 | −23 |
| K | 1.6 | 0.48 | 2.08 | 0.55 | 0.10 | 2.15 | 78 | −31 |
| L | 1.42 | 0.95 | 2.37 | 0.49 | 0.12 | 2.0 | 105 | −21 |
| M | 1.73 | 0.76 | 2.49 | 0.52 | 0.33 | 2.3 | 122 | −17 |
| N | 1.30 | 0.9 | 2.2 | 0.54 | 0.05 | 2.1 | 93 | −23 |
| O | 1.42 | 0.99 | 2.41 | 0.53 | 0.075 | 2.2 | 119 | −20 |
| P | 1.6 | 0.48 | 2.08 | 0.52 | 0.075 | 2.3 | 82 | −26 |
| Q | 1.73 | 0.76 | 2.49 | 0.50 | 0.15 | 2.1 | 125 | −15 |
| R | 1.0 | 1.2 | 2.2 | 0.48 | 0.05 | 2.0 | 90 | −20 |
| S | 1.6 | 0.45 | 2.05 | 0.49 | 0.075 | 2.3 | 80 | −27 |
| T | 1.42 | 0.98 | 2.40 | 0.50 | 0.15 | 2.2 | 117 | −21 |
| U | 1.5 | 0.76 | 2.16 | 0.54 | 0 | 2.5 | 89 | −24 |

EXAMPLE 1

A starting material having the following composition was used for the magnetic paint.

| | |
|---|---|
| Co-adsorbed gamma-$Fe_2O_3$ | 100 wt. parts |
| vinyl chloride/vinyl acetate copolymer (VAGH manufactured by UCC Inc.) | 12.5 wt. parts |
| thermoplastic polyurethane-urea resin (sample B) | 12.5 wt. parts |
| dispersant (lecitin) | 1 wt. parts |
| lubricant (silicon oil) | 1 wt. parts |
| abrasive ($Cr_2O_3$) | 2 wt. parts |
| methylethylketone | 100 wt. parts |
| methylisobutylketone | 50 wt. parts |
| toluene | 50 wt. parts |

The mixture having the above composition was ball-milled for 48 hours and filtered by using a 3 micron mesh filter. The mixture was coated on a polyethylene terephthalate film 16 microns thick so as to give a coating with a dry thickness of 6 microns. The film was subjected to magnetic orientation and cured by irradiation with an electron beam of 5 Mrad. The resulting product was calendered and cut into a ½ inch wide sample tape.

EXAMPLES 2–5

In these Examples 2 through 5, the procedures of the Example 1 were followed with the exception that the samples C, D, E and F (thermoplastic polyurethane-urea resin) were used in place of the sample B (thermoplastic polyurethane-urea resin) and respective sample tapes were also prepared in the same manner as in Example 1.

COMPARATIVE EXAMPLE 1

The procedures of Example 1 were followed, with the exception that, in place of the sample B (thermplastic polyurethane-urea resin), the sample A (polyester polyurethane resin) was used. This composition was ball-milled for 48 hours and filtered through a 3 micron filter. To the resulting product was added 2.5 weight parts of a curing agent ("Desmodule L", manufactured by Bayer AG) and the resulting product was mixed further for 30 minutes to give a magnetic paint, which was then coated on a polyethylene terephthalate film 16 microns thick so as to give a coating having a dry thickness of 6 microns. The resulting product was subjected to magnetic orientation, dried by heating and taken up on a spool. The resulting product was then calendered and cut into a ½ inch wide sample tape.

EXAMPLE 6

A starting material having the following composition was used for the magnetic paint.

| | |
|---|---|
| Co-adsorbed gamma-$Fe_2O_3$ | 100 wt. parts |

-continued

| | |
|---|---|
| vinyl chloride-vinyl acetate copolymer (VAGH manufactured by UCC Inc.) | 12.5 wt. parts |
| thermoplastic polyurethane-urea resin (sample H) | 12.5 wt. parts |
| dispersant (lecitin) | 1 wt. parts |
| lubricant (silicon oil) | 1 wt. parts |
| abrasive ($Cr_2O_3$) | 2 wt. parts |
| methylethylketone | 100 wt. parts |
| methylisobutylketone | 50 wt. parts |
| toluene | 50 wt. parts |

The above composition was ball-milled for 48 hours and filtered through a 3 micron mesh filter. The resulting magnetic paint was coated on a polyethylene terephthalate film having a thickness of 16 microns so as to give a coating having a dry thickness of 6 microns. The film was subjected to magnetic orientation, and cured by irradiation with an electron beam of 5 Mrad. The film was calendered and cut into a ½ inch wide sample tape.

EXAMPLES 7-9

The procedures of the Example 6 were followed with the exception that samples I, J and K (thermoplastic polyurethane-urea resin) were respectively used in place of the sample H (thermoplastic polyurethane-urea resin), and respective sample tapes were also prepared in the same manner as in Example 6.

EXAMPLE 10

The procedures of the Example 7 were followed with the exception that 7.5 weight parts of the vinyl chloride-vinyl acetate copolymer and 17.5 weight parts of thermoplastic polyurethane-urea resin (sample I) were used in the composition of the Example 7, and the sample tape was prepared in the same manner as in Example 6.

EXAMPLES 11-14

The procedures of the Example 6 were followed with the exception that samples L, M, N and O (thermoplastic polyurethane-urea resin) were used respectively in place of the sample H (thermoplastic polyurethane-urea resin, and the sample tapes were prepared in the similar manner as in Example 6.

EXAMPLE 15

In the composition of Example 1, the sample P (thermoplastic polyurethane-urea resin) was used in place of the sample H (thermoplastic polyurethane-urea resin) and the sample tape was prepared in the same manner as in Example 6.

EXAMPLES 16-19

In the composition of the Example 6, the samples Q, R, S and T (thermoplastic polyurethane-urea resin) were used respectively in place of the sample H (thermoplastic polyurethane-urea resin) and the respective sample tapes were prepared in the same manner as in Example 6.

COMPARATIVE EXAMPLE 2

In the composition of Example 6, the sample G (polyester polyurethane resin) was used in place of the sample H (thermoplastic polyurethane-urea resin). The composition was ball-milled for 48 hours and filtered through a 3 micron mesh filter. To the resulting product was added 2.5 weight parts of the curing agent ("Desmodule L", manufactured by Bayer AG), and the resulting mixture was mixed further for 30 minutes. The resulting product was coated on a polyethylene terephthalate film having a thickness of 16 microns so as to give a coating having a dry thickness of 6 microns. The resulting film was subjected to magnetic orientation, dried by heating and taken up on a spool. The film was calendered and cut into a ½ inch wide sample tape.

COMPARATIVE EXAMPLE 3

In the composition of Example 6, sample U (thermoplastic polyurethane-urea resin) was used in place of sample H (thermoplastic polyurethane-urea resin), and the sample tape was prepared in the same manner as in Example 6.

The sample tapes were measured for adhesion-peeling still characteristics, surface gloss and solvent resistance. The results are shown in Tables 3 and 4.

In determining adhesion-peeling, the sample tape was wound on a reel and allowed to stand for 24 hours at a temperature of 40° C. and a relative humidity of 80 percent and the peeling state of the sample tape was visually checked and evaluated by a 10-score method. The more favorable the tape adhesion, the lower the score given to the sample.

Still characteristics were determined in terms of the time elapsed until the reproduction output of the 4.2 MHz video signals recorded on the sample tape was lowered to 50%.

Surface gloss was measured with a gloss meter in terms of the light reflectivity for an incident angle of 75° and an angle of reflection of 75°.

Solvent resistance was determined by visual inspection of the changes to which the magnetic layer was subjected after the sample tape was immersed for 30 minutes in methylethylketone.

TABLE 3

| Sample tapes | Adhesion characteristics | Still characteristics | Solvent resistance |
|---|---|---|---|
| Ex. 1 | 2.5 | 880 | ○ |
| Ex. 2 | 2.0 | 950 | ○ |
| Ex. 3 | 1.0 | 1400 | ○ |
| Ex. 4 | 1.5 | 1200 | ○ |
| Ex. 5 | 2.0 | 900 | Δ |
| Com. Ex. 1 | 5.0 | 580 | Δ |

TABLE 4

| Sample tapes | Adhesion-peeling | Still characteristics (min.) | Surface gloss | Solvent resistance |
|---|---|---|---|---|
| Ex. 6 | 1.5 | 910 | 95 | ○ |
| Ex. 7 | 2.5 | 910 | 92 | ○ |
| Ex. 8 | 2.0 | 880 | 88 | ○ |
| Ex. 9 | 3.0 | 900 | 94 | ○ |
| Ex. 10 | 2.0 | 1200 | 97 | ○ |
| Ex. 11 | 1.5 | 980 | 98 | ○ |
| Ex. 12 | 1.0 | 960 | 95 | ○ |
| Ex. 13 | 2.0 | 1030 | 98 | ○ |
| Ex. 14 | 1.0 | 1180 | 102 | ○ |
| Ex. 15 | 3.0 | 1260 | 103 | ○ |
| Ex. 16 | 0.75 | 1150 | 98 | ○ |
| Ex. 17 | 2.5 | 1000 | 102 | ○ |
| Ex. 18 | 3.0 | 1100 | 100 | ○ |
| Ex. 19 | 1.0 | 1030 | 98 | ○ |
| Comp. Ex. 2 | 4.5 | 400 | 82 | Δ |
| Comp. Ex. 3 | 2.5 | 480 | 85 | ○ |

EXAMPLE 1'

A starting material having the following composition was prepared.

| | |
|---|---|
| Co-adsorbed gamma-$Fe_2O_3$ | 100 wt. parts |
| vinyl chloride-vinyl acetate copolymer (VAGH prepared by UCC Inc.) | 15 wt. parts |
| polyurethane resin ("N-2304" prepared by Nippon Polyurethane KK) | 10 wt. parts |
| dispersant (lecitin) | 1 wt. parts |
| lubricant (silicon oil) | 1 wt. parts |
| abrasive ($Cr_2O_3$) | 2 wt. parts |
| methylethylketone | 100 wt. parts |
| methylisobutylketone | 50 wt. parts |
| toluene | 50 wt. parts |

The above composition was ball-milled for 48 hours and filtered through a 3 micron mesh filter. To the resulting product was added 2.5 weight parts of the curing agent ("Desmodule L" manufactured by Bayer AG) and the resulting product was mixed further for 30 minutes to give a magnetic paint which was then coated on a 6 micron thick polyethylene terephthalate film so as to give a coating having a dry thickness of 6 microns. The magnetic layer prepared in this manner was subjected to magnetic orientation, dried and taken up on a spool.

On the other hand, a starting material having the following composition was prepared for the back coat.

| | |
|---|---|
| carbon | 100 wt. parts |
| vinyl chloride-vinyl acetate copolymer (VAGH prepared by UCC Inc.) | 15 wt. parts |
| thermoplastic polyurethane-urea resin (sample B) | 35 wt. parts |
| dispersant (lecitin) | 0.5 wt. parts |
| methylethylketone | 180 wt. parts |
| methylisobutylketone | 90 wt. parts |
| toluene | 180 wt. parts |

The above composition was ball-milled for 48 hours and filtered through a 1 micron filter. The resulting product was coated to a thickness of 2 to 3 microns on the reverse surface of the polyethylene terephthalate film with respect to the magnetic layer for providing the back coat, which was then cured by irradiation with an electron beam of 5 Mrad. The resulting film was cut to ½ inch width sample tapes.

EXAMPLES 2'-5'

In the composition of the back coat of the Example 1', samples C, D, E and F (thermoplastic polyurethane-urea resin) were used respectively in place of sample B (thermoplastic polyurethane-urea resin) and respective sample tapes were prepared in the same manner as in Example 1'.

COMPARATIVE EXAMPLE 1'

In the back coat composition of Example 1', sample A (polyester polyurethane resin) was used in place of sample B (thermoplastic polyurethane-urea resin). This composition was ball-milled for 48 hours and filtered through a 1 micron mesh filter. To the resulting product was added 5 weight parts of the curing agent ("Desmodule L" manufactured by Bayer AG) and the resulting product was mixed further for 30 minutes. The resulting mixture was coated on the reverse surface of the 16 micron thick polyethylene terephthalate film with respect to the magnetic layer so that the coating had a dry thickness of 6 microns. The film was dried by heating and taken up on a spool. The film was calendered and cut into ½ inch wide sample tapes.

EXAMPLE 6'

The following composition for the magnetic paint was prepared.

| | |
|---|---|
| Co-adsorbed gamma-$Fe_2O_3$ | 100 wt. parts |
| vinyl chloride-vinyl acetate copolymer (VAGH prepared by UCC Inc.) | 15 wt. parts |
| polyurethane resin ("N-2304" prepared by Nippon Polyurethane KK) | 10 wt. parts |
| dispersant (lecitin) | 1 wt. parts |
| lubricant (silicon oil) | 1 wt. parts |
| abrasive ($Cr_2O_3$) | 2 wt. parts |
| methylethylketone | 100 wt. parts |
| methylisobutylketone | 50 wt. parts |
| toluene | 50 wt. parts |

The above composition was ball-milled for 48 hours and filtered through a 3 micron filter. To the resulting product was added 2.5 weight parts of the curing agent ("Desmodule L" manufactured by Bayer AG) and the resulting mixture was mixed further for 30 minutes to a magnetic paint, which was then applied to a 16 micron thick polyethylene terephthalate film so that the coating had a dry thickness of 6 microns. The film was subjected to magnetic orientation, dried, taken up on a spool and calendered.

The following composition for the back coat was prepared.

| | |
|---|---|
| carbon | 100 wt. parts |
| vinyl chloride-vinyl acetate copolymer (VAGH prepared by UCC Inc.) | 15 wt. parts |
| thermoplastic polyurethane-urea resin (sample H) | 35 wt. parts |
| dispersant (lecitin) | 1 wt. parts |
| methylethylketone | 180 wt. parts |
| methylisobutylketone | 90 wt. parts |
| toluene | 180 wt. parts |

The above composition was ball-milled for 48 hours and filtered by using a 1 micron thick filter. The resulting product was applied to a thickness of 2 to 3 microns on the opposite surface of the polyethylene terephthalate film with respect to the magnetic layer as the back coat, which was then cured by irradiation with an electron beam of 5 Mrad. The resulting film was cut into a ½ inch wide sample tape.

EXAMPLES 7'-18'

In the back coat paint of the Example 6', samples I, J, K, L, M, N, O, P, Q, R, S and T (thermoplastic polyurethane-urea resin) were respectively used in place of the sample H (thermoplastic polyurethane-urea resin) and respective sample tapes were prepared in the same manner as in Example 6'.

COMPARATIVE EXAMPLE 2'

In the back coat paint of the Example 6', sample G (polyester polyurethane resin) was used in place of the sample H (thermoplastic polyurethane-urea resin). The back coat paint was ball-milled for 48 hours and filtered through a 1 micron filter. To the resulting product were added 5 weight parts of the curing agent ("Desmodule L", manufactured by Bayer AG) and the resulting mixture was mixed further for 30 minutes. The mixture was then coated on the reverse surface of the 16 micron thick polyethylene terephthalate film with respect to the magnetic so that the coating had a dry thickness of 6 microns. The film was dried by heating, taken up on a spool, calendered, and cut into a ½ inch wide sample tape.

COMPARATIVE EXAMPLE 3'

In the composition of the Example 6', the sample U (thermoplastic polyurethane-urea resin) was used in place of the sample H (thermoplastic polyurethane-urea resin) and the sample tape was prepared in the same manner as in Example 6'.

The above sample tapes were measured as to adhesion-peeling, susceptibility to injury, surface gloss and solvent resistance. The results are shown in Tables 5 and 6. In measuring susceptibility to damage, the damaged state of the back coat after repeated running of the 10-minute long tape back and forth one hundred times was checked visually. The favorable state of the back coat was marked with ⊚, the acceptable state thereof was marked with ○, the slightly damaged state thereof was marked with Δ and the severely damaged state thereof with considerable powder debris onto the pinch roll or guide member was marked with X. Surface gloss was measured with a gloss meter in terms of light reflectivity for the incident angle of 75° and the reflection angle of 75°. Solvent resistance was determined by visual inspection and in terms of the changes to which the back coat was subject when the sample tape was immersed in methylethylketone for 30 minutes.

TABLE 5

| Sample tapes | Adhesion peeling | Damage susceptibility | Solvent resistance |
|---|---|---|---|
| Ex. 1' | 3.0 | ○ | ○ |
| Ex. 2' | 2.5 | ○ | ○ |
| Ex. 3' | 1.5 | ⊚ | ○ |
| Ex. 4' | 2.0 | ⊚ | ○ |
| Ex. 5' | 2.5 | ○ | Δ |
| Comp. Ex. 1' | 6.0 | Δ | Δ |

TABLE 6

| Sample tapes | Adhesion-peeling | Damage susceptibility | Surface gloss | Solvent resistance |
|---|---|---|---|---|
| Ex. 6' | 2.5 | ⊚ | 88 | ○ |
| Ex. 7' | 3.5 | ○ | 85 | ○ |
| Ex. 8' | 3.5 | ○ | 83 | ○ |
| Ex. 9' | 4.5 | Δ~○ | 88 | ○ |
| Ex. 10' | 2.0~2.5 | ⊚ | 90 | ○ |
| Ex. 11' | 2.0 | ⊚ | 89 | ○ |
| Ex. 12' | 3.5 | ○ | 91 | ○ |
| Ex. 13' | 2.0 | ⊚ | 93 | ○ |
| Ex. 14' | 4.5 | ○~Δ | 95 | ○ |
| Ex. 15' | 1.5 | ⊚ | 91 | ○ |
| Ex. 16' | 3.5 | ○ | 93 | ○ |
| Ex. 17' | 4.5 | Δ~○ | 92 | ○ |
| Ex. 18' | 2.0 | ⊚ | 90 | ○ |
| Comp. Ex. 2' | 6.0 | Δ | 78 | ○ |
| Comp. Ex. 3' | 3.5 | ○ | 80 | ○ |

What is claimed is:

1. A magnetic recording medium comprising a nonmagnetic substrate and a magnetic layer formed thereon composed mainly of magnetic powder and an irradiation hardened binder, said binder containing a thermoplastic polyurethane-urea resin obtained by the polyaddition reaction of
   (A) a long chain diol having a molecular weight in the range of about 500 to 5000;
   (B) a short chain diol having a molecular weight in the range of about 50 to 500;
   (C) an organic diamine;
   (D) an organic diisocyanate; and
   (E) a compound having unsaturated bonds sensitive to irradiation,
   said resin having a total concentration of urea groups and urethane groups between 1.8 and 3.0 m mol/g.
2. The magnetic recording medium according to claim 1, wherein the concentration ratio of urea group to urethane group in said resin is between 0.3 and 1.6.
3. The magnetic recording medium according to claim 1, wherein the concentration of unsaturated bonds sensitive to irradiation in said resin is between 0.1 and 1.0 mmol/g.
4. The magnetic recording medium according to claim 1, wherein the number-average molecular weight of said resin is between 2000 and 60000.
5. The magnetic recording medium according to claim 4, wherein the number-average molecular weight of said resin is between 5000 and 40000.
6. The magnetic recording medium according to claim 1, wherein the softening point of said resin is not less than 80° C.
7. The magnetic recording medium according to claim 6, wherein the softening point of said resin is not less than 100° C.
8. The magnetic recording medium according to claim 1, wherein the glass transition point of said resin is not more than 0° C.
9. The magnetic recording medium according to claim 8, wherein the glass transition point of said resin is not more than −10° C.
10. The magnetic recording medium according to claim 1, wherein the weight ratio of the short chain diol to the long chain diol is not more than 3.
11. The magnetic recording medium according to claim 1, wherein the long chain diol is a polyester diol, a polyether diol or a polyether ester diol.
12. The magnetic recording medium according to claim 11, wherein the polyester diol is obtained by the reaction of an aliphatic dicarboxylic acid, an aromatic dicarboxylic acid or a lower alcohol ester of the dicarboxylic acid with a glycol.
13. The magnetic recording medium according to claim 12, wherein the aliphatic dicarboxylic acid is succinic acid, adipic acid, sebasic acid or azelaic acid.
14. The magnetic recording medium according to claim 12, wherein the aromatic dicarboxylic acid is terephthalic acid or isophthalic acid.
15. The magnetic recording medium according to claim 12, wherein the lower alcohol ester of dicarboxylic acid is a methyl or ethyl ester.
16. The magnetic recording medium according to claim 12, wherein the glycol is ethylene glycol, 1,3-propylene glycol, 1,4-butylene glycol, 1,6-hexane glycol, diethylene glycol, neopentyl glycol or an ethylene oxide or propylene oxide adduct of bisphenol A.
17. The magnetic recording medium according to claim 1, wherein the long chain diol is a polyester diol, a polyether diol or a polyether ester glycol.

18. The magnetic recording medium according to claim 17, wherein the polyester diol is obtained by the reaction of an aliphatic dicarboxylic acid, an aromatic dicarboxylic acid or a lower alcohol ester of the dicarboxylic acid with a glycol.

19. The magnetic recording medium according to claim 18, wherein the aliphatic dicarboxylic acid is succinic acid, adipic acid, sebacic acid or azelaic acid.

20. The magnetic recording medium according to claim 18, wherein the aromatic dicarboxylic acid is terephthalic acid or isophthalic acid.

21. The magnetic recording medium according to claim 18, wherein the lower alcohol ester is a methyl or ethyl ester.

22. The magnetic recording medium according to claim 18, wherein the glycol is ethylene glycol, 1,3-propylene glycol, 1,4-butylene glycol, 1,6-hexane glycol, diethylene glycol, neopentyl glycol or an ethylene oxide or propylene oxide adduct of bisphenol A.

23. The magnetic recording medium according to claim 17, wherein the polyether diol is obtained by the cleavage polymerization of a lactone.

24. The magnetic recording medium according to claim 23, wherein the lactone is ε-caprolactone.

25. The magnetic recording medium according to claim 17, wherein the polyether diol is polyether glycol.

26. The magnetic recording medium according to claim 25, wherein the polyether glycol is polyethylene glycol, polypropylene ether glycol or polytetramethylene ether glycol.

27. The magnetic recording medium according to claim 17, wherein the polyether ester glycol is a polyester glycol obtained by the reaction of a polyalkylene ether glycol with an aliphatic dicarboxylic acid or an aromatic dicarboxylic acid.

28. The magnetic recording medium according to claim 27, wherein the polyalkylene ether glycol is polyethylene glycol, polypropylene ether glycol or polytetramethylene ether glycol.

29. The magnetic recording medium according to claim 27, wherein the aliphatic acid is succinic acid, adipic acid, sebacic acid or azelaic acid.

30. The magnetic recording medium according to claim 27, wherein the aromatic acid is terephthalic acid or isophthalic acid.

31. The magnetic recording medium according to claim 1, wherein the short chain diol is an aliphatic glycol or an aromatic diol.

32. The magnetic recording medium according to claim 1, wherein the aliphatic glycol is ethylene glycol, propylene glycol, 1,4-butylene glycol, 1,6-hexane glycol or neopentyl glycol.

33. The magnetic recording medium according to claim 31, wherein the aromatic diol is an ethylene oxide or propylene oxide adduct of biophenol A or an ethylene oxide adduct of hydroquinone.

34. The magnetic recording medium according to claim 1, wherein the organic diamine is an aliphatic diamine, an aromatic diamine or an alicyclic diamine.

35. The magnetic recording medium according to claim 1, wherein the organic diisocyanate is an aliphatic diisocyanate, an aromatic diisocyanate or an alicyclic diisocyanate.

36. The magnetic recording medium according to claim 1, wherein the compound having unsaturated bonds sensitive to irradiation is a diol having unsaturated bonds sensitive to irradiation, a diamine having unsaturated bonds sensitive to irradiation or a diisocyanate having unsaturated bonds sensitive to irradiation.

37. A magnetic recording medium comprising a non-magnetic substrate and a magnetic layer formed thereon composed mainly of magnetic powder and a binder, said binder containing a thermoplastic polyurethane-urea resin having unsaturated bonds sensitive to irradiation and being obtained by the polyaddition reaction of (A) a long chain diol having a molecular weight in the range of about 500 to 5000;
(B) a short chain diol having a molecular weight in the range of about 50 to 500;
(C) an organic diamine;
(D) an organic diisocyanate;
(E) a compound having unsaturated bonds sensitive to
(F) a compound having at least one hydrophilic polar group selected from the group consisting of the groups represented by the following formulas:
—SO₃M, —OSO₃M, —COOM and

wherein M is hydrogen or alkali metal and M' is hydrogen, alkali metal or a hydrocarbon group, said thermoplastic polyurethane-urea resin being hardened under irradiation, the total concentration of urea groups and urethane groups in said resin being between 1.8 and 3.0 m mol/g.

38. The magnetic recording medium according to claim 37, wherein the concentration ratio of urea group to urethane group in said resin is between 0.3 and 1.6.

39. The magnetic recording medium according to claim 37, wherein the concentration of unsaturated bonds sensitive to irradiation in said resin is between 0.1 and 1.0 m mol/g.

40. The magnetic recording medium according to claim 37, wherein the concentration of hydrophilic polar group in said resin is between 0.01 and 1.0 m mol/g.

41. The magnetic recording medium according to claim 40, wherein the concentration of hydrophilic polar group in said resin is between 0.1 and 0.5 m mol/g.

42. The magnetic recording medium according to claim 37, wherein the number-average molecular weight of said resin is between 2000 and 60000.

43. The magnetic recording medium according to claim 42, wherein the number-average molecular weight of said resin is between 5000 and 40000.

44. The magnetic recording medium according to claim 37, wherein the softening point of said resin is not less than 80° C.

45. The magnetic recording medium according to claim 44, wherein the softening point of said resin is not less than 100° C.

46. The magnetic recording medium according to claim 37, wherein the glass transition point of said resin is not more than 0° C.

47. The magnetic recording medium according to claim 46, wherein the glass transition point of said resin is not more than −10° C.

48. The magnetic recording medium according to claim 37, wherein the weight ratio of the short chain diol to the long chain diol is not more than 3.

49. The magnetic recording medium according to claim 37, wherein the long chain diol is a polyester diol, a polyether diol or a polyether ester diol.

50. The magnetic recording medium according to claim 49, wherein the polyester diol is obtained by the reaction of an aliphatic dicarboxylic acid, an aromatic dicarboxylic acid or a lower alcohol ester of the carboxylic acid with a glycol.

51. The magnetic recording medium according to claim 50, wherein the aliphatic dicarboxylic acid is succinic acid, adipic acid, sebacic acid or azelaic acid.

52. The magnetic recording medium according to claim 50, wherein the aromatic dicarboxylic acid is terephthalic acid isophthalic acid.

53. The magnetic recording medium according to claim 50, wherein the lower alcohol ester of dicarboxylic acid is a methyl or ethyl ester.

54. The magnetic recording medium according to claim 50, wherein the glycol is ethylene glycol, 1,3-propylene glycol, 1,4-butylene glycol, 1,6-hexane glycol, diethylene glycol, neopentyl glycol or an ethylene oxide or propylene oxide adduct of bisphenol A.

55. The magnetic recording medium according to claim 37, wherein the long chain diol is a polyester diol, a polyether diol or a polyether ester glycol.

56. The magnetic recording medium according to claim 55, wherein the polyester diol is obtained by the reaction of an aliphatic dicarboxylic acid, an aromatic dicarboxylic acid or a lower alcohol ester of the dicarboxylic acid with a glycol.

57. The magnetic recording medium according to claim 56, wherein the aliphatic dicarboxylic acid is succinic acid, adipic acid, sebacic acid or azelaic acid.

58. The magnetic recording medium according to claim 56, wherein the aromatic dicarboxylic acid is terephthalic acid or isophthalic acid.

59. The magnetic recording medium according to claim 56, wherein the lower alcohol ester is a methyl or ethyl ester.

60. The magnetic recording medium according to claim 52, wherein the glycol is ethylene glycol, 1,3-propylene glycol, 1,4-butylene glycol, 1,6-hexane glycol, diethylene glycol, neopentyl glycol or an ethylene oxide or propylene oxide adduct of bisphenol A.

61. The magnetic recording medium according to claim 55, wherein the polyether diol is obtained by the cleavage polymerization of a lactone.

62. The magnetic recording medium according to claim 61, wherein the lactone is ε-caprolactone.

63. The magnetic recording medium according to claim 55, wherein the polyether diol is polyether glycol.

64. The magnetic recording medium according to claim 63, wherein the polyether glycol is polyethylene glycol, polypropylene ether glycol or polytetramethylene ether glycol.

65. The magnetic recording medium according to claim 55, wherein the polyether ester glycol is a polyester glycol obtained by the reaction of a polyalkylene ether glycol with an aliphatic dicarboxylic acid or an aromatic dicarboxylic acid.

66. The magnetic recording medium according to claim 65, wherein the polyalkylene ether glycol is polyethylene glycol, polypropylene ether glycol or polytetramethylene ether glycol.

67. The magnetic recording medium according to claim 65, wherein the aliphatic dicarboxylic acid is succinic acid, adipic acid, sebacic acid or azelaic acid.

68. The magnetic recording medium according to claim 65, wherein the aromatic dicarboxylic acid is terephthalic acid or isophthalic acid.

69. The magnetic recording medium according to claim 37, wherein the short chain diol is an aliphatic glycol or an aromatic diol.

70. The magnetic recording medium according to claim 69, wherein the aliphatic glycol is ethylene glycol, propylene glycol, 1,4-butylene glycol, 1,6-hexane glycol or neopentyl glycol.

71. The magnetic recording medium according to claim 69, wherein the aromatic diol is an ethylene oxide or propylene oxide adduct of bisphenol A or an ethylene oxide adduct of hydroquinone.

72. The magnetic recording medium according to claim 37, wherein the organic diamine is an aliphatic diamine, an aromatic diamine or an alicyclic diamine.

73. The magnetic recording medium according to claim 37, wherein the organic diisocyanate is an aliphatic diisocyanate, an aromatic diisocyanate or an alicyclic diisocyanate.

74. The magnetic recording medium according to claim 57, wherein the compound having unsaturated bonds sensitive to irradiation is a diol having unsaturated bonds sensitive to irradiation, a diamine having unsaturated bonds sensitive to irradiation or a diisocyanate having unsaturated bonds sensitive to irradiation.

75. The magnetic recording medium according to claim 37, wherein the compound having hydrophilic polar group is a diol having hydrophilic polar group, a diamine having hydrophilic polar group or a diisocyanate having hydrophilic polar group.

76. A magnetic recording medium comprising a non-magnetic substrate, a magnetic layer formed on one surface of said non-magnetic substrate and a back coating layer composed of an irradiation hardened binder and non-magnetic pigment formed on the other surface of said non-magnetic substrate, said binder containing a thermoplastic polyurethane-urea resin obtained by the polyaddition reaction of
(A) a long chain diol having a molecular weight in the range of about 500 to 5000;
(B) a short chain diol having a molecular weight in the range of about 50 to 500;
(C) an organic diamine;
(D) an organic diisocyanate; and
(E) a compound having unsaturated bonds sensitive to irradiation, said resin having a total concentration of urea groups and urethane groups between 1.8 and 3.0 m mol/g.

77. The magnetic recording medium according to claim 76, wherein the concentration ratio of urea group to urethane group in said resin is between 0.3 and 1.6.

78. The magnetic recording medium according to claim 76, wherein the concentration of unsaturated bonds sensitive to irradiation in said resin is between 0.1 and 1.0 m mol/g.

79. The magnetic recording medium according to claim 76, wherein the number-average molecular weight of said resin is between 2000 and 60000.

80. The magnetic recording medium according to claim 79, wherein the number-average molecular weight of said resin is between 5000 and 40000.

81. The magnetic recording medium according to claim 76, wherein the softening point of said resin is not less than 80° C.

82. The magnetic recording medium according to claim 81, wherein the softening point of said resin is not less than 100° C.

83. The magnetic recording medium according to claim 76, wherein the glass transition point of said resin is not more than 0° C.

84. The magnetic recording medium according to claim 83, wherein the glass transition point of said resin is not more than −10° C.

85. The magnetic recording medium according to claim 76, wherein the weight ratio of the short chain diol to the long chain diol is not more than 3.

86. The magnetic recording medium according to claim 76, wherein the magnetic layer is composed mainly of magnetic powder and a binder.

87. The magnetic recording medium according to claim 76, wherein the magnetic layer is composed of ferromagnetic metal thin film.

88. The magnetic recording medium comprising a non-magnetic substrate, a magnetic layer formed on one surface of said non-magnetic substrate and a back coating layer composed of a binder and non-magnetic pigment formed on the other surface of said non-magnetic substrate, said binder containing a thermoplastic polyurethane-urea resin having unsaturated bonds sensitive to irradiation and being obtained by the polyaddition reaction of
(A) a long chain diol having a molecular weight in the range of about 500 to 5000;
(B) a short chain diol having a molecular weight in the range of about 50 to 500;
(C) an organic diamine;
(D) an organic diisocyanate;
(E) a compound having unsaturated bonds sensitive to irradiation; and
(F) a compound having at least one hydrophilic polar group selected from the group consisting of the groups represented by general formulas:
—SO$_3$M, —OSO$_3$M, —COOM and

wherein M is hydrogen or alkali metal and M' is hydrogen, alkali metal or hydrocarbon group, said thermoplastic polyurethane-urea resin being hardened under irradiation, the total concentration of urea groups and urethane groups in said resin being between 1.8 and 3.0 m mol/g.

89. The magnetic recording medium according to claim 88, wherein the concentration ratio of urea group to urethane group in said resin is between 0.3 and 1.6.

90. The magnetic recording medium according to claim 88, wherein the concentration of unsaturated bonds sensitive to irradiation in said resin is between 0.1 and 1.0 m mol/g.

91. The magnetic recording medium according to claim 88, wherein the concentration of hydrophilic polar group in said resin is between 0.01 and 1.0 m mol/g.

92. The magnetic recording medium according to claim 91, wherein the concentration of hydrophilic polar group in said resin is between 0.1 and 0.5 m mol/g.

93. The magnetic recording medium according to claim 88, wherein the number-average molecular weight of said resin is between 2000 and 60000.

94. The magnetic recording medium according to claim 93, wherein the number-average molecular weight of said resin is between 5000 and 40000.

95. The magnetic recording medium according to claim 88, wherein the softening point of said resin is not less than 80° C.

96. The magnetic recording medium according to claim 95, wherein the softening point of said resin is not less than 100° C.

97. The magnetic recording medium according to claim 88, wherein the glass transition point of said resin is not more than 0° C.

98. The magnetic recording medium according to claim 97, wherein the glass transition point of said resin is not more than −10° C.

99. The magnetic recording medium according to claim 97, wherein the weight ratio of the short chain diol to the long chain diol is not more than 3.

100. The magnetic recording medium according to claim 88, wherein the magnetic layer is composed mainly of magnetic powder and a binder.

101. The magnetic recording medium according to claim 88, wherein the magnetic layer is composed of ferromagnetic metal thin film.

* * * * *